Sept. 16, 1969  J. HARMAN  3,466,739
MACHINE TOOLS WITH TOOL CHANGE FACILITIES
Filed July 28, 1967  19 Sheets-Sheet 1

INVENTOR
J. HARMAN
By Glascock, Downing & Seebold
Attorneys

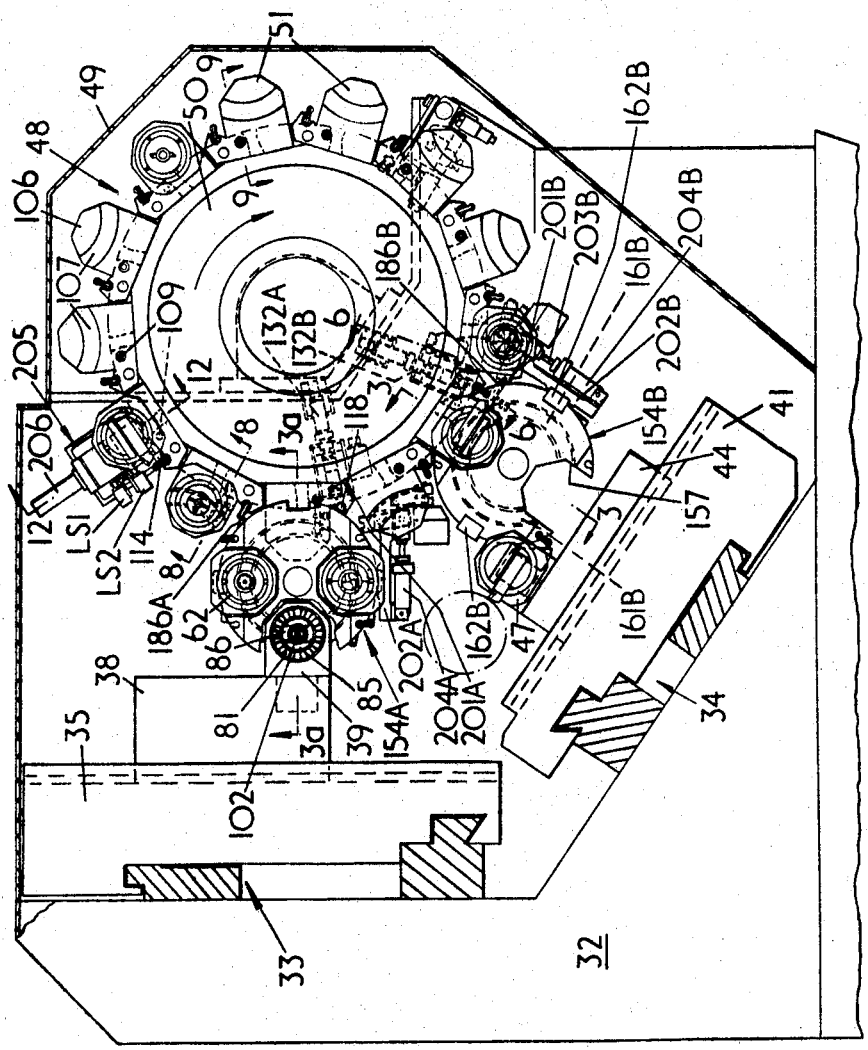

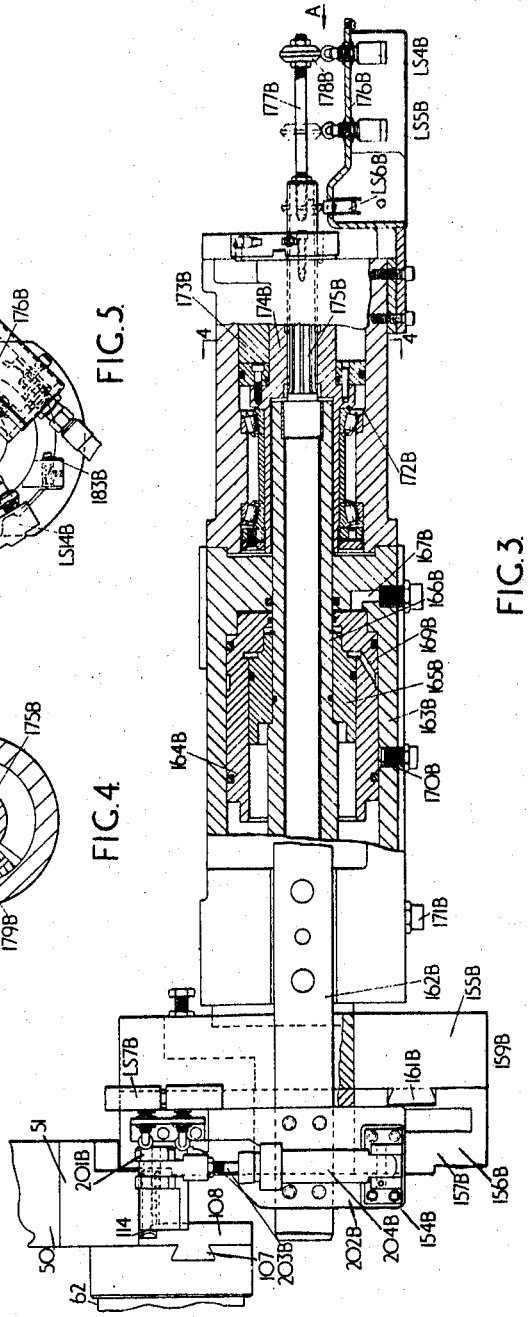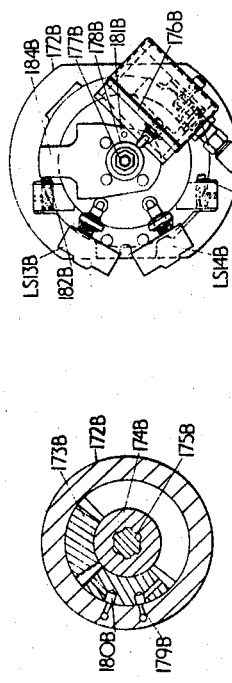

Sept. 16, 1969     J. HARMAN     3,466,739
MACHINE TOOLS WITH TOOL CHANGE FACILITIES
Filed July 28, 1967

Sept. 16, 1969     J. HARMAN     3,466,739
MACHINE TOOLS WITH TOOL CHANGE FACILITIES
Filed July 28, 1967     19 Sheets-Sheet 6

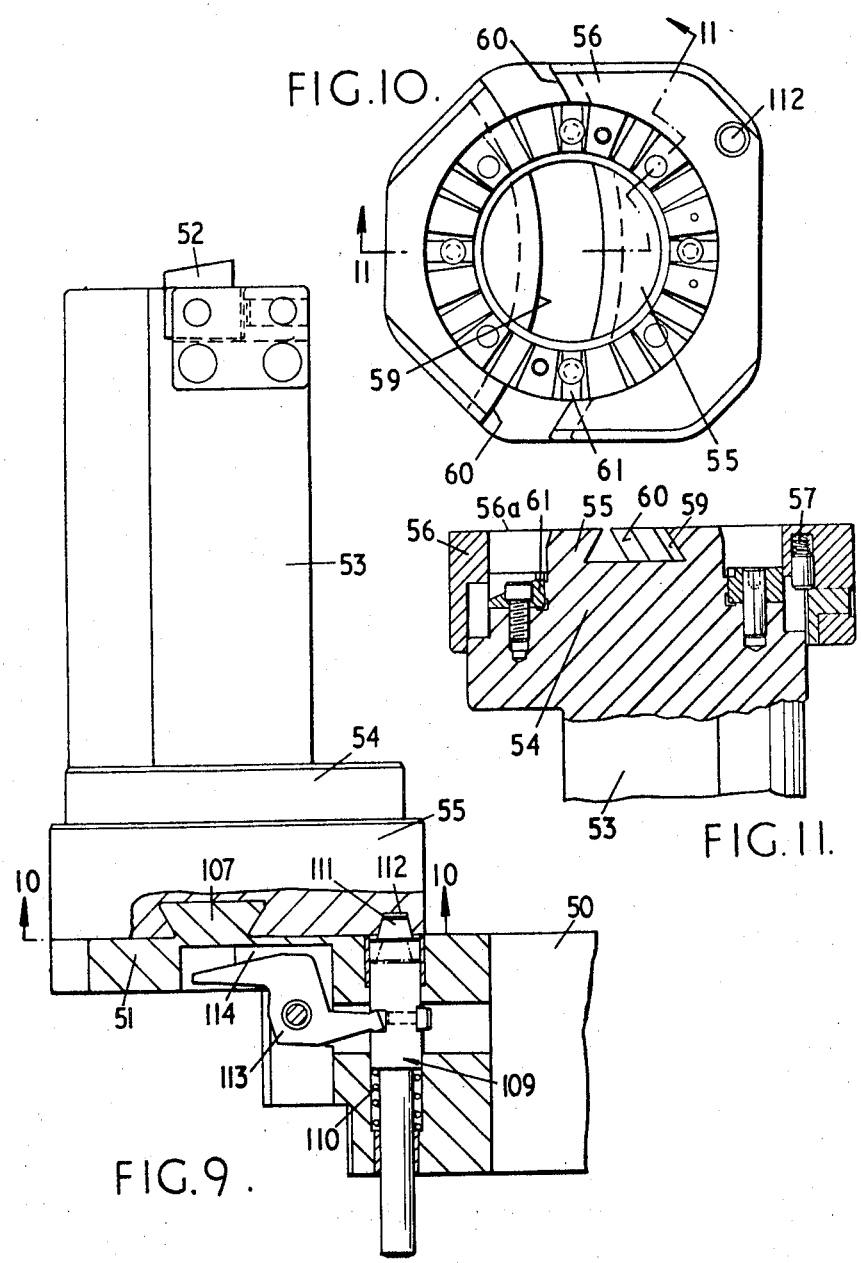

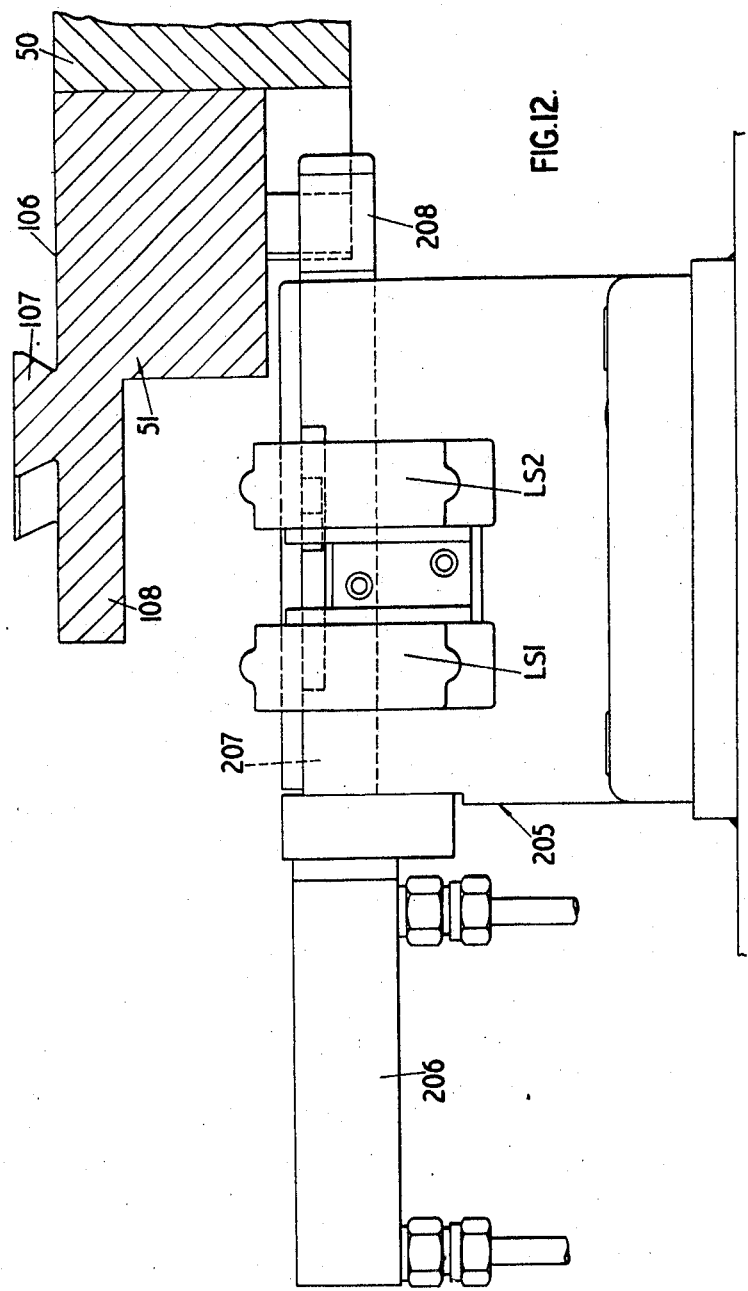

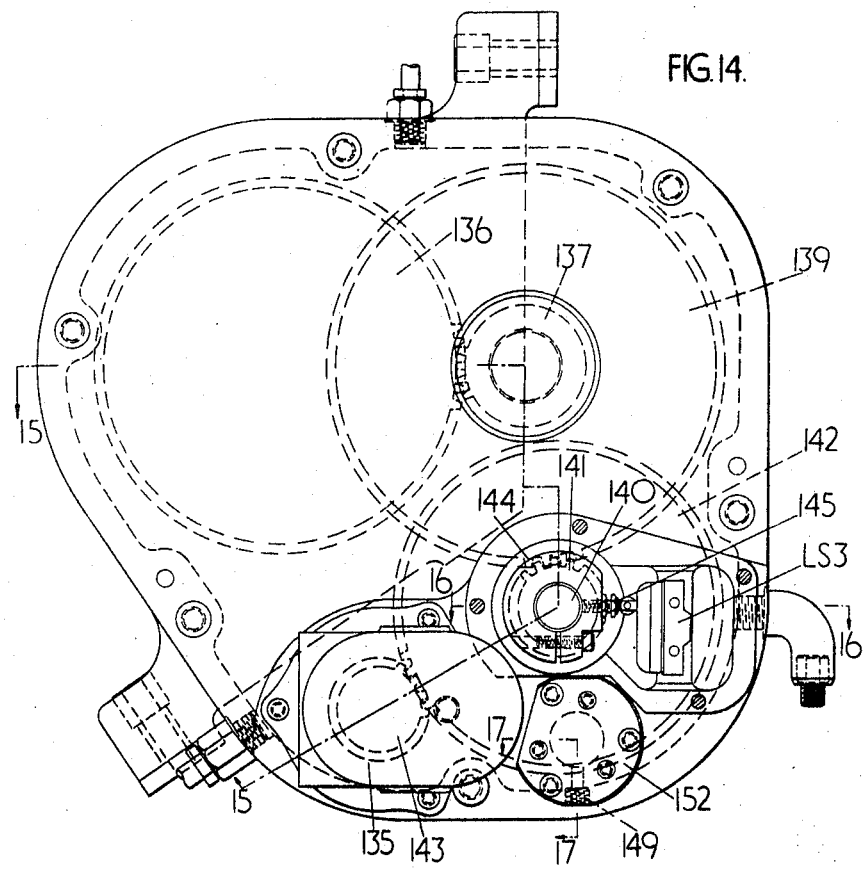

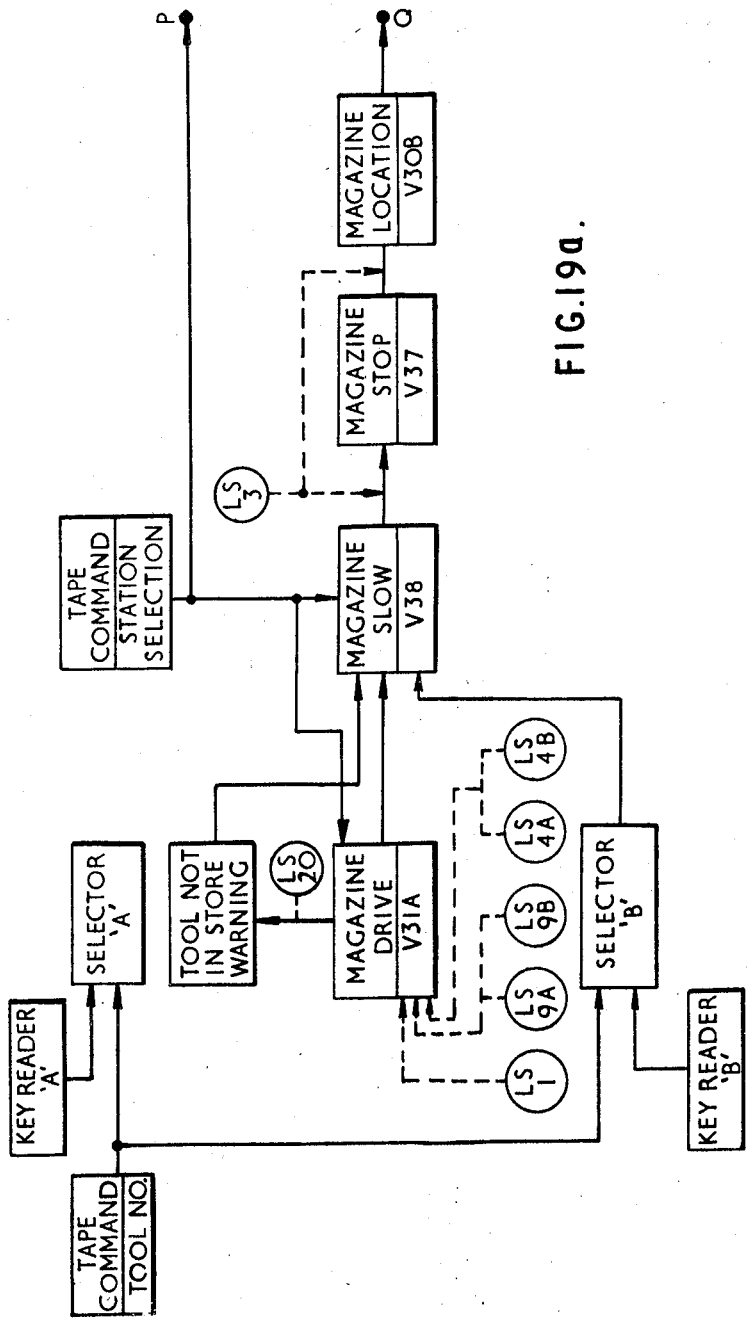

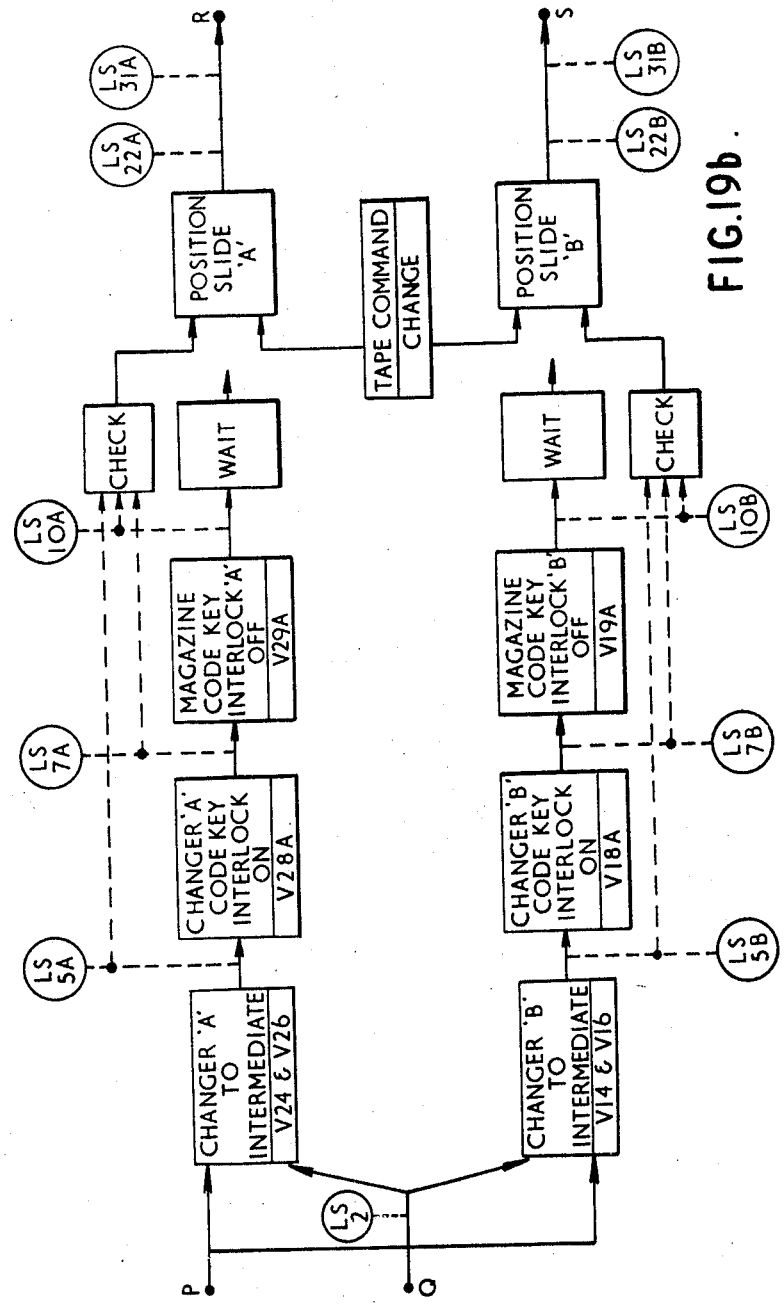

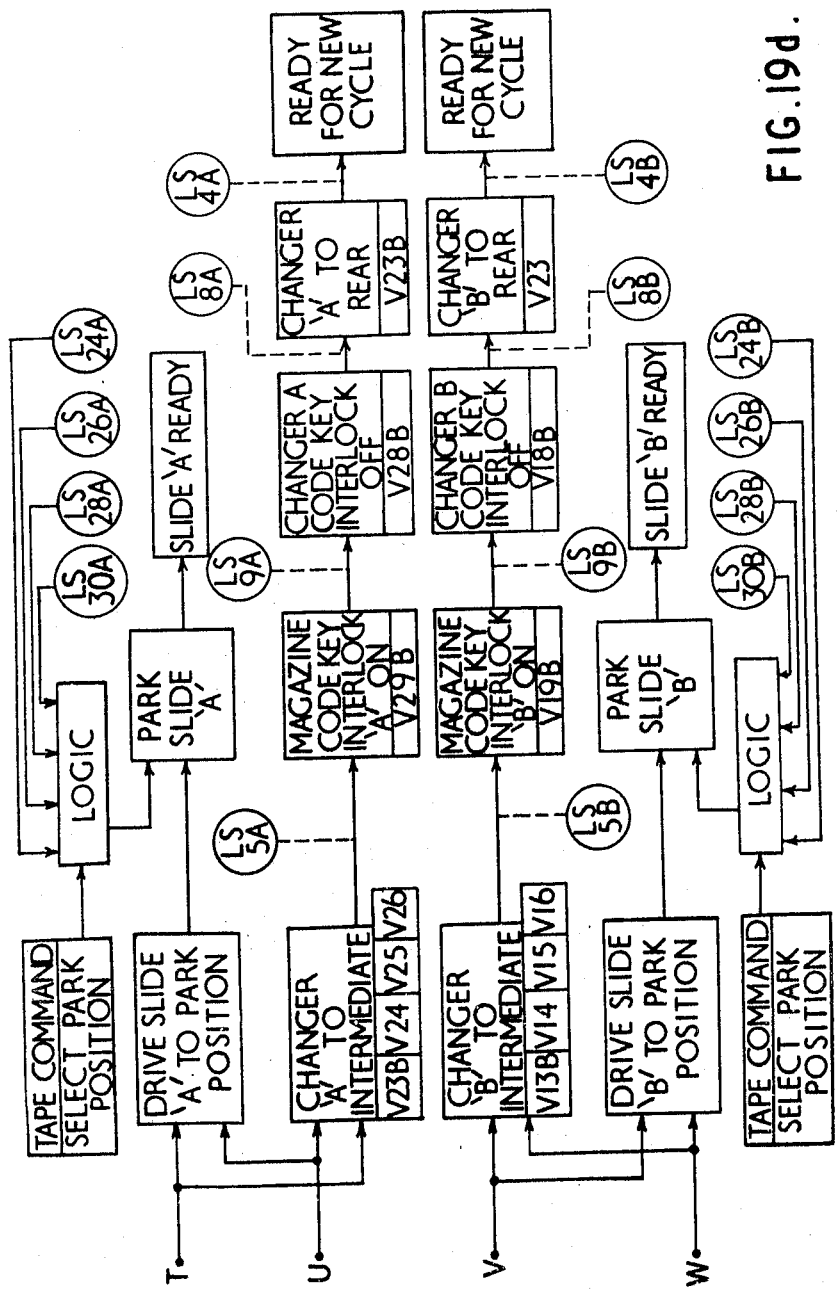

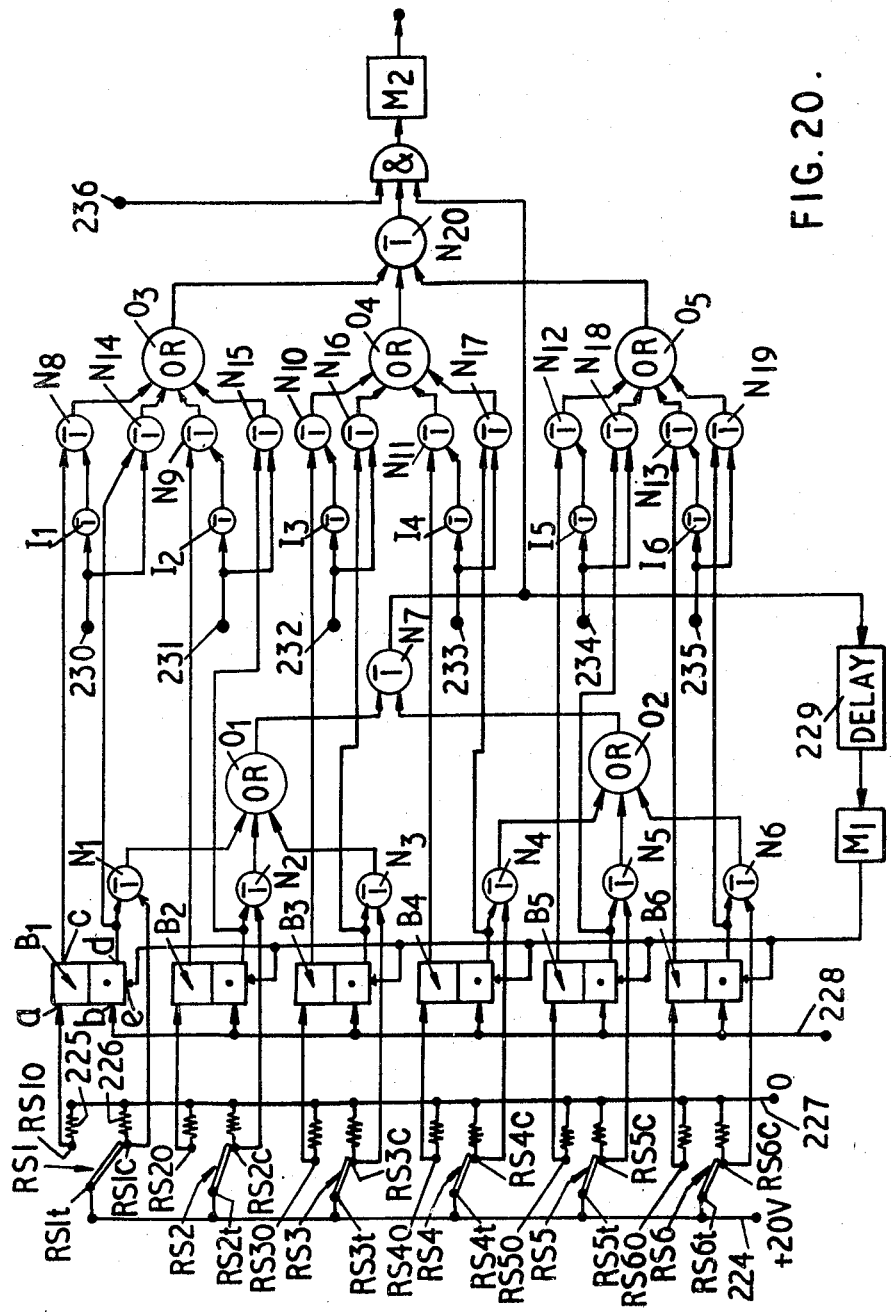

United States Patent Office 3,466,739
Patented Sept. 16, 1969

3,466,739
MACHINE TOOLS WITH TOOL CHANGE FACILITIES
Julius Harman, Baginton, England, assignor to Alfred Herbert Limited, Coventry, England, a British company
Filed July 28, 1967, Ser. No. 656,845
Claims priority, application Great Britain, July 28, 1966, 33,929/66; Nov. 11, 1966, 50,646/66, 50,649/66, 50,651/66, 50,652/66, 50,653/66
Int. Cl. B23q *17/00*
U.S. Cl. 29—568    32 Claims

ABSTRACT OF THE DISCLOSURE

A tool change lathe has two tool slides, a single tool magazine and two separate tool changers for transferring tools from the magazine to the respective slides. The individual tools in the magazine are identified by coded keys in the magazine. The tool changers each take a key from the magazine when the associated tool is removed and store the key whilst that tool is operating. Each tool changer has a head including a non-rotary part which, in combination with the magazine and the slide, forms a substantially closer circular track around which tools being exchanged are driven without axial displacement. The tools are located on the slides by toothed coupling rings in a plane perpendicular to the headstock spindle. One slide has a drive shaft extending through the toothed coupling ring. In each case the tool is transferred by the tool changer on to a draft member which is hydraulically actuated to draw the toothed coupling rings together. A mechanical locking arrangement guards against failure of the hydraulic system.

---

This invention relates to machine tools with automatic tool-changing apparatus and to such tool-changing apparatus. The invention relates specifically to the kind of tool changing apparatus comprising a tool magazine for receiving a plurality of tools, power operable drive means for moving the tools in the magazine relative to a support, tool transfer means for transferring tools to and from the magazine, and to and from tool mount means whereon tools can operate on a workpiece, tool identification means for identifying the position of a desired tool as the tools in the magazine are driven and control means for stopping said power operable means with the desired tool presented to the tool transfer means under the control of said tool identification means.

In a machine tool of the kind specified and in accordance with the invention the tool magazine has a plurality of tool locating means and a plurality of locating means for tool identification devices associated respectively with tools carried by the magazine, and means arranged to remove a tool identification device from the magazine when the associated tool is removed by the tool transfer means and to place a tool identication device in the magazine on placing of the associated tool in a tool locating means corresponding to the locating means into which the identification device is placed, whereby, in use, the tool identification devices provide an indication of the tool positions in the magazine for actuation of the tool identification means, such indication being corrected at each tool changing operation.

It is to be understood that the term "tool" used hereinbefore covers tools of all types including rotary tools such as drills, taps, reamers, form tools and milling cutters as well as turning or boring tools such as are used on lathes. In addition the term is intended to be applicable to such items as work-holding chucks, turning centres and the like. Furthermore the term "tool" is to be understood as including, where appropriate, the combination of a tool proper and a holder therefor.

The invention also provides a machine tool comprising a base structure workpiece mounting means on said base structure for mounting a workpiece for machining, at least two tool mount means independently movable on the base structure for carrying tools to operate on a workpiece mounting means, and at least two tool transfer means for transferring tools from a tool storage means to the tool mount means respectively, the arrangement being such that a tool change operation can be effected in respect of one of the tool mount means whilst a machining operation is in progress involving other tool mount means.

It is also a feature of this invention that the tool storage means comprises a tool storage magazine rotatable about an axis equi-distant from the plurality of tool transfer means so that any tool can be transferred from the magazine to any one of the tool mount means by the appropriate tool transfer means.

The invention further provides a machine tool including at least one tool mounting means, adapted to receive a tool for operating on a workpiece in the machine tool, an indexible tool storage magazine including a plurality of tool carrying elements for carrying tools for mounting on the tool mounting means, and a power operated tool transfer device for interchanging a tool on the tool mounting means with a selected tool on the tool storage magazine, characterised in that said tool transfer device includes a non-rotatable part, which is aligned with the tool mounting means and any one of the tool carrying elements to form a substantially continuous circular track for guiding tools during transfer, and an angularly movable part having tool engaging portions engageable with tools to displace them along the track on angular movement of the angularly movable part relative to the non-rotatable part.

The invention further provides a machine tool including at least one tool mounting means adapted to receive a tool for operating on a workpiece in the machine tool, an indexible tool storage magazine including a plurality of tool carrying elements for carrying tools for mounting on the tool mounting means, and a power operated tool transfer device for interchanging a tool on the tool mounting means with a selected tool on the tool storage magazine, characterised in that the tool transfer device transfers tools between the tool storage magazine and the tool mounting means without any axial motion being applied to said tools by said tool transfer device.

In accordance with another feature of the invention a machine tool with automatic tool change facilities includes a tool mount means comprising a casing, a toothed coupling ring mounted on said casing and adapted to coact with a similar ring on a tool holder to locate the tool holder accurately in position on the casing in a predetermined orientation, a draft member slidably mounted in the casing and movable by power means to a projecting position extending beyond said coupling and a withdrawn position, said member having means engageable with a tool holder to draw its coupling ring into engagement with the coupling ring on the casing, and mechanical locking means actuatable to retain said member in its withdrawn position independently of said power means and releasable on actuation of said power means, to move said member to its projecting position.

In accordance with a further feature of the invention, a machine tool with automatic tool change facilities includes a tool mount means comprising a casing which is movable on the machine tool axially towards and away from a rotatable work holding device of the machine tool and is also movable transversely, a toothed coupling device on said casing, which device extends in a plane perpendicular to the axis of the workholding device and having teeth projecting axially towards the workholding device, said teeth being shaped to coact with teeth on a similar coupling device on a tool or tool holder accurately to position the tool or tool holder on the casing, and draft means for applying an axial force to a tool or tool holder to retain the teeth of the two coupling devices in accurate interengagement.

In accordance with yet a further feature of the invention, a machine tool with automatic tool change facilities includes mount means comprising a casing, a toothed coupling ring on the casing for interengagement with a similar ring on a tool holder so as accurately to locate the tool holder on the casing, a draft member slidable in the casing and arranged so as to be extendable through the ring and engageable with the tool holder, for drawing the toothed coupling rings firmly into interengagement, and a rotatable drive shaft extending into a passage in said draft member and having at its end a drive coupling part adapted to engage a coacting drive coupling part on a rotatable part of the tool holder when the latter is drawn on to the casing.

By way of example, reference is now made to the accompanying drawings in which:

FIGURE 2 is an enlarged section on the line 2—2 in FIGURE 1 showing the relative dispositions of the beds, tool mount means, tool storage magazine, and tool transfer mechanisms;

FIGURE 3 is a still further enlarged section taken on the line 3—3 in FIGURE 2 showing one of the tool transfer mechanisms in a withdrawn position to permit rotation of the magazine;

FIGURE 4 is a section on line 4—4 in FIGURE 3;

FIGURE 5 is a view looking in the direction of arrow A in FIGURE 3;

FIGURE 9 is an enlarged fragmentary section on line 9—9 in FIGURE 2 showing a turning tool on the magazine;

FIGURE 10 is a section on line 10—10 in FIGURE 9;

FIGURE 11 is a section on line 11—11 in FIGURE 10;

FIGURE 12 is an enlarged fragmentary section on line 12—12 in FIGURE 2 showing a magazine locking and locating device;

FIGURE 14 is an enlarged view on the arrow 14 in FIGURE 1 and showing the drive arrangement for the magazine;

FIGURE 16 is a section on line 16—16 in FIGURE 14;

FIGURE 17 is a section on line 17—17 in FIGURE 14;

FIGURE 20 is a more detailed electronic logic circuit diagram of the part of the control system of the lathe involved with the selection of tools from the magazine.

Figure 1:
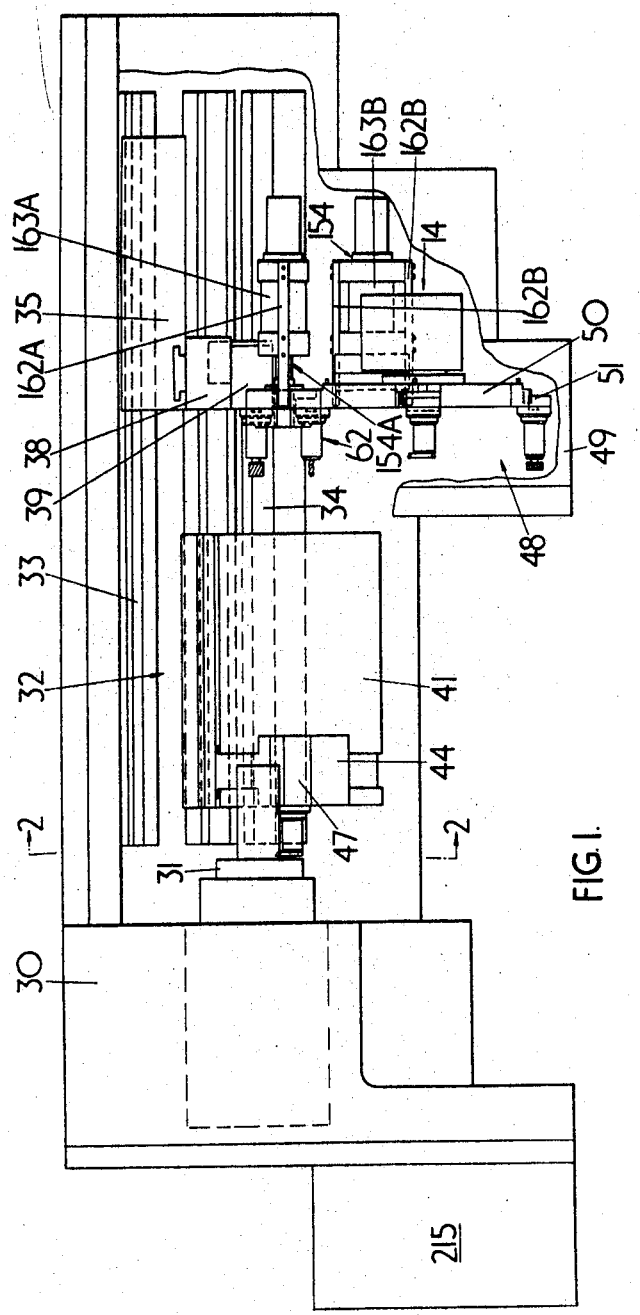
FIGURE 1 is a plan view of a numerically controlled lathe which incorporates two beds, a single tool storage magazine and tool transfer mechanisms for transferring tools from the magazine to tool mount means on the beds respectively.

As mentioned the machine takes the general form of a lathe, having a headstock 30 with a rotatable spindle 31 which carries, in use, a workpiece engaging chuck. The headstock 30 houses variable speed gearing for driving the spindle 31 at a variety of different rotary speeds in each direction.

The headstock is joined to a bed structure 32 which comprises, in fact, two distinct beds 33, 34 with their lengths extending horizontally and parallel to the axis of the spindle 31. The bed 33 lies in a vertical plane behind the spindle axis, whilst the bed 34 lies beneath the spindle axis and is forwardly and downwardly inclined to permit swarf to fall off it. The bed 34 is closer to the spindle axis than is the bed 33.

Figure 18A:
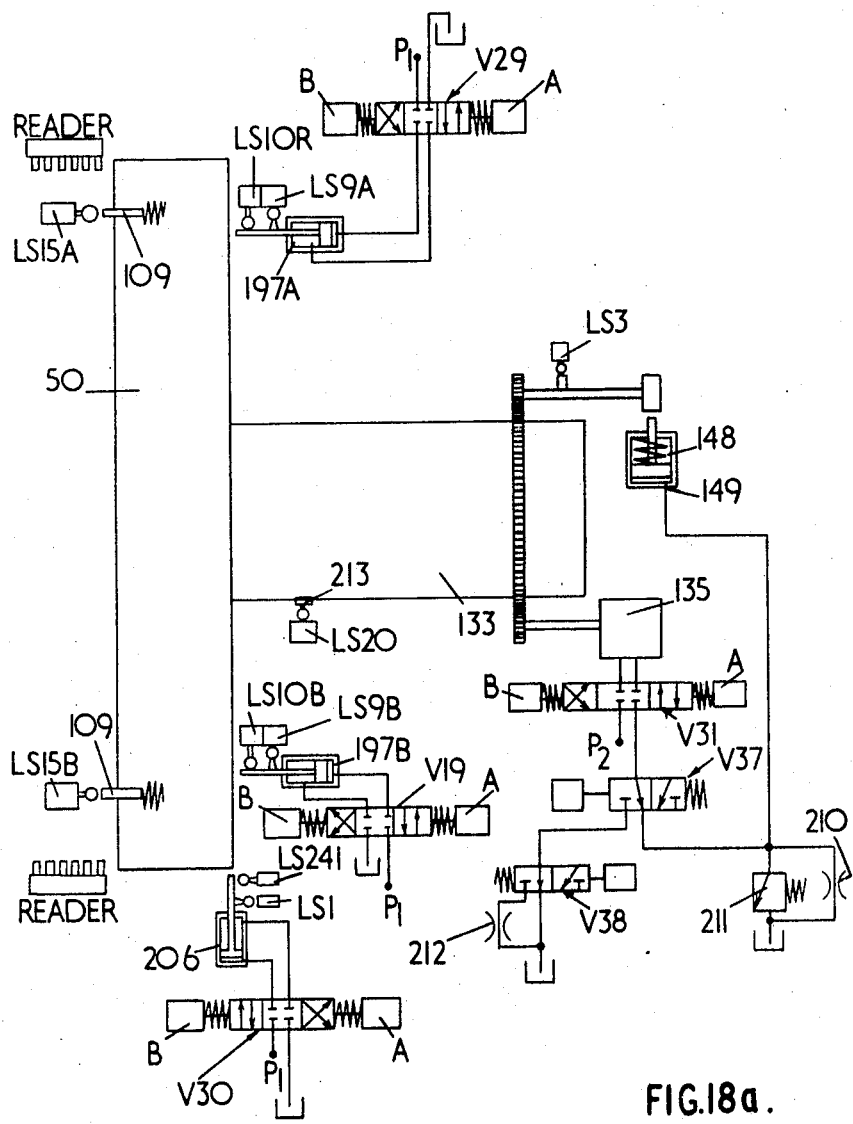
FIGURE 18 is a schematic diagram of the hydraulic system of the parts of the machine associated with tool changing operations, FIGURE 18a showing the magazine system, FIGURE 18b the tool changer systems, and FIGURE 18c the systems associated with the tool mount means.
Figure 18B:
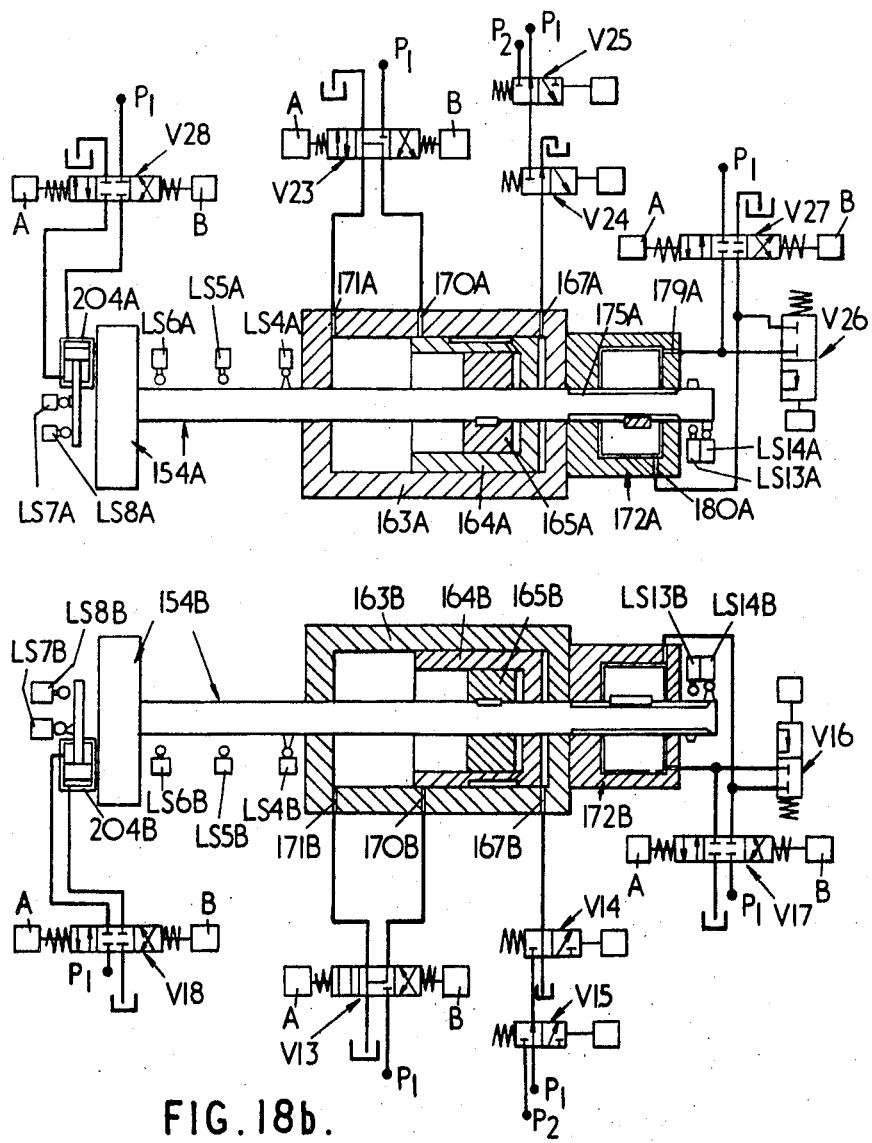
Figure 18C:
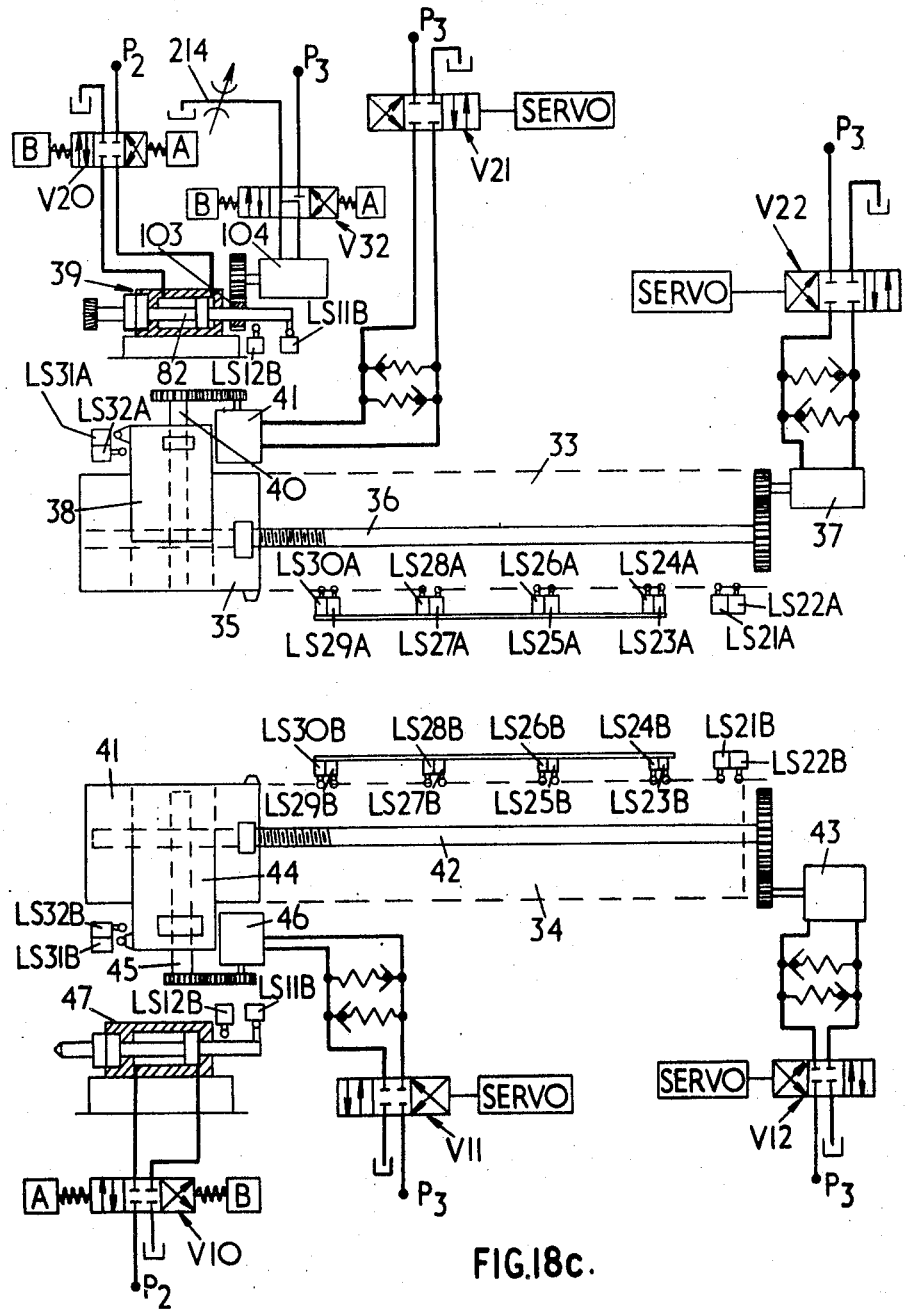

The bed 33 slidably supports a saddle 35 which can be traversed along the bed 33 by a lead screw 36 driven by an hydraulic motor 37 (see FIGURE 18c). The saddle 35 likewise slidably supports a slide 38 movable in a direction perpendicular to the axis of the spindle 31. The slide 38 has fixed to it a tool mount means 39, which is shown in detail in FIGURES 7 and 8. The slide 38 can be traversed across the saddle 35 by means of a lead screw 40 driven by an hydraulic motor 41 (see FIGURE 18c).

The bed 34 carries a saddle 41 drivable along the bed by a lead screw 42 connected to an hydraulic motor 43. The saddle 41 slidably supports a slide 44 movable transversely of the spindle axis by means of a lead screw 45 driven by an hydraulic motor 46. The slide 44 incorporates a second tool mount means 47.

The tool mount means 39 is arranged to be capable of receiving power driven rotary tools, such as drills, taps and shell mills, whilst the tool mount means 47 is not provided with any tool drive arrangement and can only receive fixed tools for operating on the rotating workpiece.

The lathe also includes automatic means for changing the tools carried by the tool mount means 39 and 47. Tools for placement on the two tool mount means are carried by a magazine 48 (which is shown in FIGURE 1 with its cover 49 partially broken away). The magazine is in the form of a rotary polygonal disc 50 with a plurality (in this specific case, thirteen) of projecting tool carriers 51. In FIGURE 2 tools are shown on some only of the carriers, but in practice these would all be employed.

The tools used in the lathe all incorporate tool holders with certain basic features which enable them to be carried on the magazine and to be transferred accurately to the tool mount means 39 and 47. A simple turning tool arrangement is shown in FIGURES 9 to 11. The tool 52 itself is carried at one end of tool holder shank 53 of substantial cross-sectional dimensions. This shank extends, in use, in a direction parallel to the axis of the spindle 31. At the opposite end of the shank the tool holder has an end portion 54 adapted to co-act with the tool mount means and the magazine tool carriers. Such end portion includes a central spigot 55 the free end of which is of slightly tapering form. Slidably mounted on the exterior of the end portion 54 is a cowl 56 which is urged by springs 57 against stops to make an end face 56a of the cowl co-planar with the end face of the spigot 55. The spigot 55 and the cowl 56 are formed with portions 59, 60 of a dovetail groove of arcuate form.

A tooth coupling ring 61 is mounted on the end portion 54 of the tool holder, surrounding the spigot 55 and surrounded by the cowl 56. In the example shown the ring 61 has twelve teeth equi-angularly spaced around the axis of the tool holder. The ring 61 lies in a plane perpendicular to this axis. The teeth on the ring are formed by machining profiled grooves in one face of the ring. The milling cutter used for rough machining has cutting edges parallel to the cutter axis for form the bases of the grooves and further cutting edges inclined at an included angle of say 40°. The cutter is rotated in a plane radial with respect to the ring axis and is fed along a path inclined at an angle of 21° 12' to the plane of ring. The grooves are finished with a similarly dressed grinding wheel to a depth such that the angular width of each groove measured in a plane slightly below the facial plane of the teeth is precisely 15°.

Thus two of the rings described can be interengaged with their teeth interdigitated by a distance equal to twice the spacing of the 15° width plane from the facial plane. The two rings will be accurately self-aligning by virtue of the inclination of the interengaged flanks of the teeth.

Figure 8:
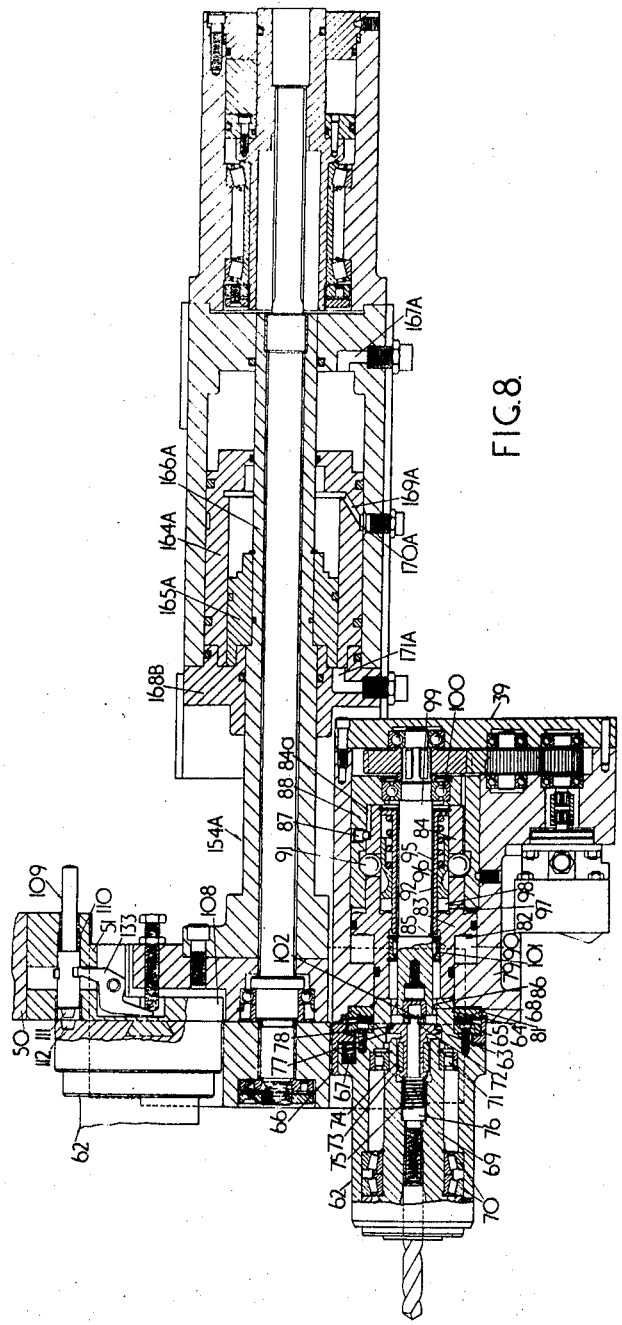
FIGURE 8 is another fragmentary view on the line 3a—3a but showing the parts in yet a further position.

FIGURE 8 shows, in section, details of a tool holder 62 for carrying a rotary tool. This is essentially similar to the turning tool tool holder as regards the features which enable it to be mounted on the tool mount means 39 and on the magazine tool carriers 51. To this end the tool holder body has an end portion 63 having a central spigot 64 surrounded by a toothed coupling ring 65 identical to the ring 61. In the case of this particular tool holder, a cowl 66 which surrounds the ring 65 differs from the cowl 56 in that it is urged by its springs 67 to a position in which its end is level with the base of the dovetail groove 68 in the spigot. No dovetail groove is formed in the end of the cowl 66.

The body of the tool holder 62 rotatably supports a tool bearing member 69, suitable thrust and journal bearings 70, 71 being provided for this purpose. The tool bearing member has a tool locating arrangement at one end although this is not shown in any great detail in the drawings since arrangements for mounting rotary tools in this manner are extremely well known.

A dog member 72 is slidably mounted in a bore at the opposite end of the tool bearing member 69 within a bore in the spigot 64. The dog member 72 is drivingly coupled to the tool bearing member 69 by means of keys 73 in keyways 74 within the tool bearing member 69. The dog member 72 is spring loaded by means of a compression spring 75 abutted against an adjustable screw-threaded element 76 inside the tool bearing member 69. Motion of the dog member 72 under the influence of the spring 75 is limited by the interaction between a flange 77 at the end of the dog member 72 and an internal shoulder 78 within the spigot 64.

Figure 7:
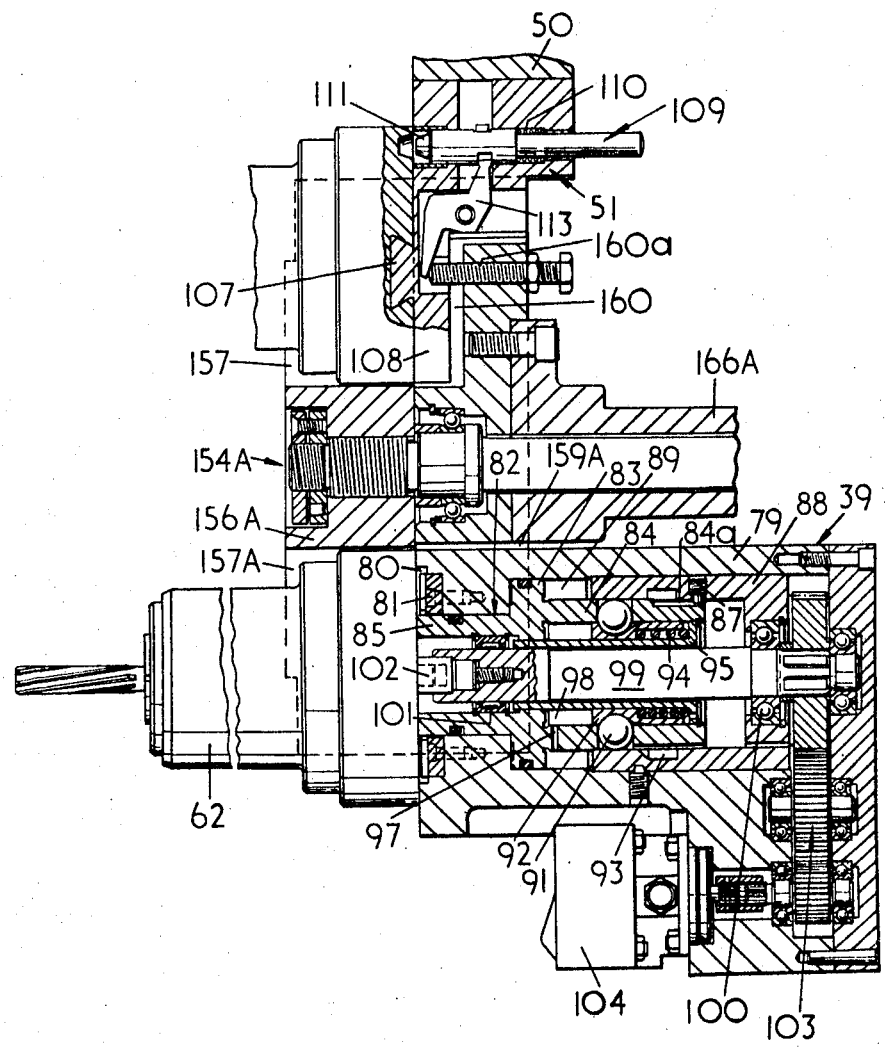
FIGURE 7 is a fragmentary section taken on the line 3a—3a in FIGURE 2, but showing the parts of the tool transfer mechanism in a different position.

FIGURES 7 and 8 also show the tool mount means 39 in detail. The tool mount means 39 includes a casing 79 mounted on the slide 38. The shape of the end of the casing corresponds with the external shape of the cowl 56 or 66 on the tool holder and the upper part of the casing maintains this shape along its whole length. The end of the casing 79 has a recess 80 in which a rib 80 on the cowl 56 is a close fit. Mounted in this recess 80 is another toothed coupling ring 81 identical to the rings 61 and 65 but offset angularly by 15°.

Slidably mounted in a stepped central bore through the casing is a hollow draft member 82 having an integral piston 83 intermediate its ends, a sleeve portion 84 projecting from one side of the piston 83 and a hollow spigot portion 85 projecting from the other side of the piston 83. The spigot portion 85 projects, as shown, through the ring 81 and its free end is formed with an arcuate dovetail key 86 complementary to the dovetail grooves across the face of the spigot 55 or 64 of the tool holder body. The member 82 is held against rotation relative to the casing 79 by means of a peg 87 mounted in a cup-shaped element 88 secured inside the casing around said sleeve portion 84. The peg 87 engages in a longitudinal groove 84a in the sleeve portion 84.

The member 82 forms, in combination with the casing 79, a double acting hydraulic piston and cylinder unit. The member 82 is movable to the position shown in FIGURE 7 by the introduction of pressurised liquid into the chamber 89 defined by the end of the cup-shaped element 88, the internal surface of the casing 79, the external surface of the sleeve portion 84 and one face of the piston 83. The member 82 can, on the other hand, be withdrawn to the position shown in FIGURE 8 by introducing liquid into a chamber 90 defined on the other side of the piston 83.

It will thus be seen that a tool holder can be simply and accurately engaged with the tool mount means 39 by interengaging the dovetail groove 68 in the end of the tool holder with the dovetail key 86 on member 82, and then causing the member 82 to be hydraulically withdrawn into the casing until the toothed coupling ring 65 is firmly in engagement with the ring 81. The rib on the cowl 64 on the tool holder fits closely in the recess 80 in the tool mount means and prevents foreign matter entering the toothed coupling.

It will be appreciated that a radially toothed coupling such as that described is subject to climb, i.e. a torsional load applied to the tool holder will tend to turn one ring 65 relative to the other ring 81, which turning movement, if permitted, would be accomplished by relative axial separation of the coupling rings. This tendency must be overcome by ensuring that the axial force applied to the member 82 is in excess of the maximum climb force likely to be met in use. It is considered that the use of hydraulics to hold the member 82 in position is insufficient in view of the danger of air inclusions in the liquid and of minor hydraulic failures such as valve leakage and slight flexibility in pipes, cylinder walls, etc. In addition it would be most undesirable to have an arrangement in which an hydraulic failure leading to a pressure drop in the hydraulic system could permit the tool holder to become displaced or even totally disassociated from the tool mount means.

Accordingly, a mechanical locking arrangement is incorporated in the tool mounting means for holding the member 82 in a withdrawn position and preventing accidental disengagement of the toothed coupling rings. The locking arrangement makes use of steel balls 91 located in transverse bores in the sleeve portion 84 of member 82. The diameter of each ball 91 is greater than the wall thickness of the sleeve portion 84 so that the balls must project either outwardly or inwardly from the sleeve portion 84. The action of the balls 91 is controlled by a collar 92 slidable within the sleeve portion 84 and the balls can enter recesses 93 in the wall of the cup-shaped element 88. The recesses 93 are positioned to receive the balls 91 when the member 82 is fully withdrawn and each has a sloping front end 93a.

The collar 92 is urged towards the piston 83 by means of a compression spring 94 loaded against a tubular insert 95 within the sleeve portion 84 and in sliding contact with the collar 92. The collar 92 has an external groove 96 shaped at the end nearest the piston 83 to a part-toroidal configuration. The end of the groove remote from the piston is frusto-conical and of relatively shallow inclination so as to be capable of acting as a wedge. The toroidal portion and the wedging frusto-conical portion of the groove are joined by a more steeply inclined frusto-conical ramp portion.

FIGURE 8 shows the positions that the balls 91 and the collar 92 take up when the member 82 is fully withdrawn. It will be appreciated that the ramp portion of collar 92 under the action of the spring 94 will cause the balls to be displaced outwardly as they come into register with the recesses 93. Final outward displacement of the balls enables the collar 92 to travel so far relative to the sleeve portion 84 that the wedging frusto-conical portion of the groove in the collar engages the balls and applies an outward force on them. Engagement of the balls 91 against the sloping faces 93a of the recesses 93 thereby very strongly resists any axial movement of member 82 which would permit a loosening of the engagement between the toothed coupling rings 65 and 81.

Release of the locking means is achieved by hydraulically applying to the collar 92 a force opposing the spring 94 to restore the collar 92 to the position shown in FIGURE 7. To this end a cross bore 97 in the sleeve portion 84 connects the chamber 89 to a chamber 98 defined within the sleeve portion 84 by the insert 95. Thus when hydraulic pressure is applied to the chamber 89 to restore the member 82 to its projecting position as shown in FIGURE 7, pressure will also be applied to the end of the collar 92 to displace it to a position where the balls 91 can be displaced inwardly by the inclined ends of the notches 93.

To provide a drive to the dog member 72 in the tool holder 62 there is provided a shaft 99 supported in bearings 100 in the casing 79 at one end and extending at its other end into the interior of the spigot portion 85 of the member 82, within which the shaft 99 is supported by a roller bearing 101. Secured to said other end of the shaft 99 is a dog 102 interengageable with the dog member 72. The shaft 99 is coupled through gearing 103 in the casing to an hydraulic motor 104.

Thus, in use, when a tool holder 62 is located on the end of spigot portion 85 and the member 82 is drawn into the casing 79 to interengage the toothed coupling rings 65 and 81 the dog 102 is also interengaged with dog member 72. Since it is unlikely that these will be relatively orientated correctly to intermesh, the freedom of the dog member 72 is slide against the spring 75 comes into play. When the shaft 99 is rotated, however, and there is some resistance to turning of the tool bearing member 69 resulting from engagement of a tool thereon with the work, the dog clutch 72, 102 will become properly engaged.

The tool mount means 47, having no power drive arrangement, is considerable simpler than tool mount means 39. The shaft 99, and the gearing 103 and the motor 104 are all omitted.

Figure 13:
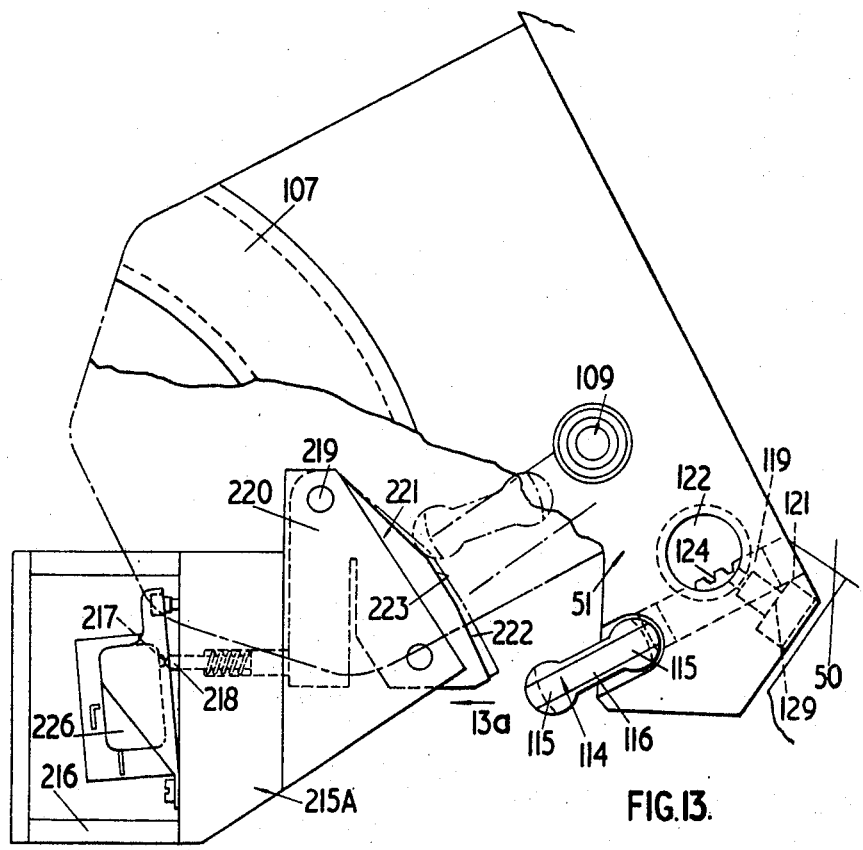
FIGURE 13 is an enlarged view of a reading head which coacts with the aforementioned tool identification devices, being a view taken in the same direction as FIGURE 2.

The tool carriers 51 of the magazine 48 are all identical, being shown in front elevation in FIGURES 2 and 13 and in section in FIGURES 6, 7, 8, 9 and 12. Each tool carrier 51 has a flat front face 106 on which an arcuate dovetail key 107, complementary to the dovetail grooves in the tool holder ends, is formed. Such keys 107 are of arcuate form of radius corresponding to the radii of the grooves, and each has its own centre of curvature situated radially beyond the carrier 51 with respect to the centre of the disc 50.

The rear face of each tool carrier 51 is of stepped form, being flush with the rear face of the disc 50 at the periphery thereof and forming a relatively thin portion 108 at the radially outermost extremity thereof. It is on this thin portion 108 that the dovetail key 107 is formed.

Means are provided for locking tool holders on to the tool carriers 51. Such means comprises a slidable bolt 109 on each carrier 51. This bolt 109 is urged by a spring 110 so that a tapered nose part 111 of the bolt 109 projects from the front face of the tool carrier 51. The nose part 111 enters a recess formed in the tool holder, e.g. the recess 112 shown in the end face of the cowl 56 in FIGURES 9 and 10. The interaction between the tool holder and the bolt 109 prevents the tool holder from being slid along the dovetail key 107.

For withdrawing the bolt 107, each carrier 51 has a pivoted lever 113 housed in a recess 114 in its rear face. One end of this lever fits into a notch in the bolt 109 so that the application of pressure to the other end of the lever 113 will swing the lever and withdraw the nose part 111 of the bolt from the recess 112 (as shown in FIGURES 7 and 8).

Each of the tool carriers 51 is also adapted to carry a tool identification device associated with the tool thereon. This device is shown most clearly in FIGURES 6 and 13 and comprises a key 114 having a pair of spaced parallel cylindrical portions 115 interconnected by a flat integral web 116. The opposite areas of the two portions 115 are grooved to define a binary coding for the key. Each cylindrical portion 115 also has, adjacent one end a tapered notch 117. There are six positions on each cylindrical portion 115 where a tool coding groove may be formed and there are, of course, many combinations of grove arrangements which can be used. In the present example it is intended to utilize the coding to indicate a decimal number for the tool. Four groove positions indicate the units digit of the number and the other two indicate the tens digit. In the case of the key shown in FIGURE 6 there is a groove at the uppermost possible position but no groove at the next position. The tens digit is therefore represented by the binary number 01 or 1. Similarly the units digit is represented by 0101 and is therefore 5. The tool number corresponding to the key shown is thus 15. The same arrangement of grooves is present on both cylindrical portions 115.

To receive the key 114 the tool carrier 51 has a slot 118 of keyhole shape, the narrow end of which opens on to the periphery of the carrier 51. This slot receives one of the cylindrical portions 115 and the web 116, leaving the other cylindrical portion 115 projecting beyond the periphery of the carrier 51 behind the thin portion 108 of the carrier 51.

Figure 6:
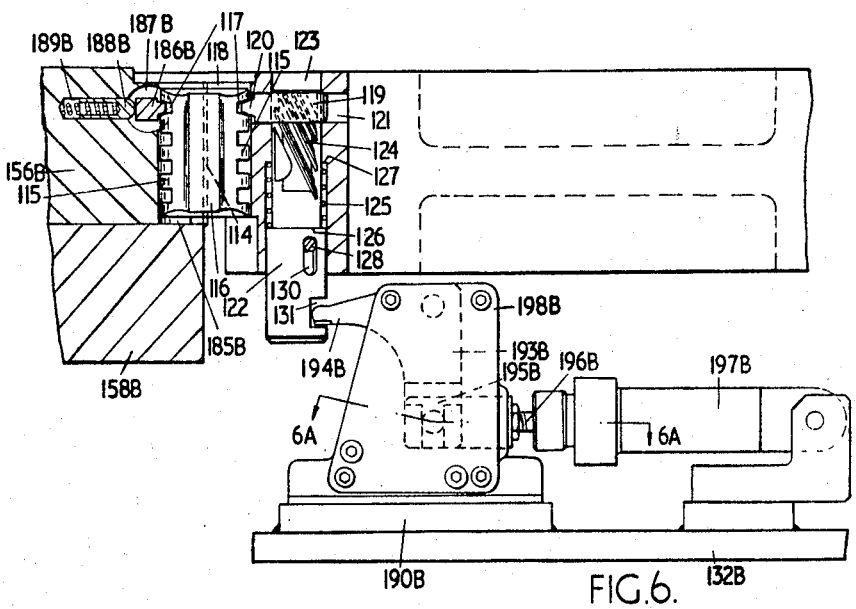
FIGURE 6 is an enlarged fragmentary section on line 6—6 in FIGURE 2 showing an arrangement whereby removable tool identification devices are interlocked with the magazine and a device for freeing the interlock.

An arrangement is provided for locking the individual keys 114 in the slots 118, such arrangement being shown most clearly in FIGURES 6 and 13. As shown a latch piece 119, with a wedge-shaped end 120 adapted to be received by the appropriate one of the notches 117 in the key 114, is slidable in a substantially radial bore 121 in the carrier 51. A latch drive element 122 is slidable in an intersecting bore 123 parallel to the rotary axis of the disc 50. The latch piece 119 and the element 122 have flats in which interengaged inclined tooth formations 124 are formed. These teeth are such that movement of the element 122 away from the front face 106 of the carrier 51 (i.e. downwardly as viewed in FIGURE 6) will result in driving of the end 120 of the latch piece 119 into the slot 118 which receives the key 114. The end 120 is received by a notch 117 in a key 114 carried in the slot 118, so as to lock the key firmly in a predetermined position. The wedge-shape of the end 120 ensures that the key does, in fact, take up the desired position within close limits.

Movement of the element 122 in this direction is achieved by means of a spring 125 which acts on a shoulder 126 of the element 122 and on a shoulder 127 within the bore 123. Movement of the element 122 is limited by the engagement of the latch piece 119 with the key 114. For occasions when there is no key 114 in the slot 118, however, there is a stop 128 provided on the end of a screw 129 engaged in a hole in the carrier 51, said stop projecting into a milled longitudinally extending groove 130 in the element 122.

The end of the element 122 projects from the rear face of the carrier 51 and is formed with a transverse groove 131. This end of the element 122 is engaged to release the latch piece 119 from engagement with the key 114, by a mechanism 132 as will be hereinafter described.

Figure 15:
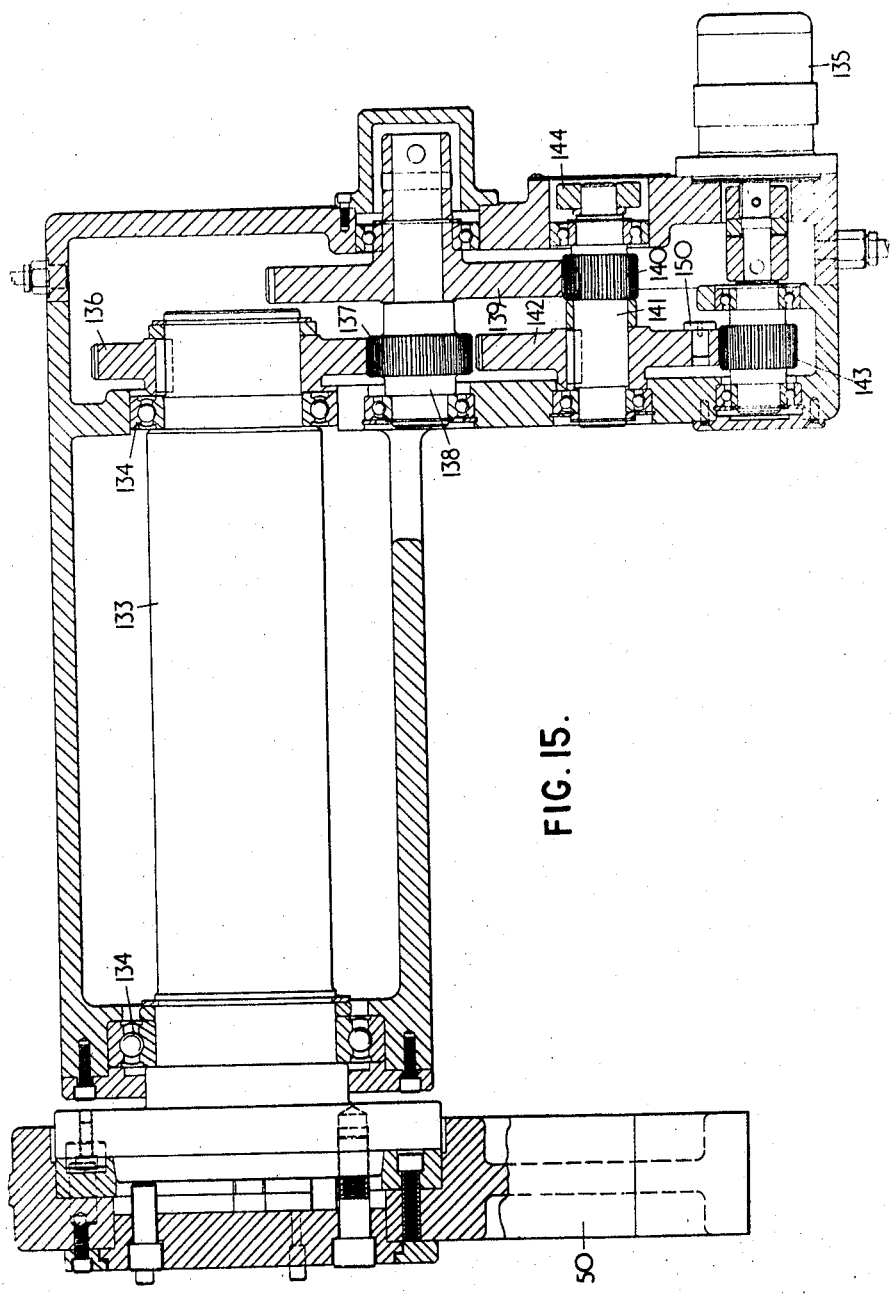
FIGURE 15 is a compound section view on line 15—15 in FIGURE 14.

The disc 50 and the carriers 51 thereon, together with the tools carried thereby, can be driven to and accurately located in any of thirteen equi-angularly spaced positions. For driving the disc plate 50 there is provided the arrangement shown in FIGURES 14 and 15. The disc 50 is supported on the end of a rotary shaft 133 carried by bearings 134. The shaft 133 is drivingly connected to an hydraulic motor 135 through the intermediary of a gear pair 136, 137 respectively having 78 and 28 teeth and respectively being mounted on the shaft 133 and on a parallel spindle 138. A gear 139 on spindle 138 has 84 teeth and engages a gear 140 on a further parallel spindle 141. The gear 140 has 18 teeth so that one revolution of spindle 141 causes one-thirteenth of a revolution of the shaft 133. The spindle 141 is connected via further reduction gears 142, 143 to the shaft of motor 135.

The spindle 141 carries a rotary cam 144 with an adjustable screw element 145 the head of which effectively forms the lobe of the cam. This element 145 co-acts with a fixed microswitch LS3. A dead-stop peg 146 is carried by a piston 147 slidable is a cylinder 148. This peg can be driven out to the projecting position shown in FIGURE 17 by pressurised oil introduced through a port 149. In this position the end of the peg 146 lies in the path of an abutment 150 on the gear 142. The end of the peg 146 is chamfered as shown in FIGURE 17 and the abutment 150 is likewise provided with a flat to be engaged by the peg. To keep the peg properly oriented a dowel 151 is mounted on a cover 152 which is fitted over the end of the cylinder 148. The dowel is slidably received by a bore in the piston 147. A compression spring 153 provides the necessary force to return the peg 146 to a retracted position when it is required to permit rotation of the gear 142.

The lathe also includes two tool transfer mechanisms 154A and 154B for transferring tools between the magazine 48 and the two tool mount means 39, 47 respectively. These two mechanisms are identical in all respects and in the following description therefore, only one tool transfer mechanism is described. The reference numerals used in the drawings will be seen to carry the suffix A or B according to the mechanism to which they refer. In the description these suffixes are not used herein initially.

The tool transfer mechanism 154 incorporates a head 155 which is axially moveable relative to the tool storage magazine 48 and one part 156 of the head is angularly movable on an axis parallel to the rotary axis of the disc 50 and coinciding with the centre of the above-mentioned circular path defined by the arcuate dovetail key 107 of a carrier presented to the mechanism 154. The part 156 of the head is in the form of a circular plate formed at diametrically opposite positions with notches 157 corresponding in size and shape to the external cross-section of cowls 56, 66 of the tool holders used in the lathe.

The head 155 also includes a non-rotatable part 158 which is of substantially circular form and has, at one position on its periphery, a notch 159 shaped like the notches 157. At a diametrically opposite position, however the part 158 has a recess 160 shaped to co-act with the back of the tool carrying element 51. An abutment in the form of a screw 160 is mounted in this recess to co-act with the lever 113.

The mounting of the tool transfer mechanism 154 is such that the notch 159 in the part 158 of the head 155 can pass over the tool mount means 39 or 47 when the latter is in position for tool exchange whilst, at the same time, the recess 160 can receive a tool carrying element 51. Furthermore the face of the part 158 which is directed towards the part 156 is provided with an arcuate dovetail-section rib 161 received in a groove in the face of the part 156. This rib 161 is so disposed that when the head 155 is advanced axially to a tool exchange position and the tool mounting means 39 or 47 is in its tool exchange position, the rib 161, the dovetail key 86 and the dovetail key 107 form a substantially continuous circular dovetail track around which a tool holder can be driven by means of the part 156.

The head 155 is guided for axial movement by a pair of bars 162 secured to a tool changer body 163. The body 163 forms the cylinder of an hydraulic unit for axial displacement of the head 155. This unit includes an outer piston 164 of cup-shaped form slidable within the body 163 and an inner piston 165 slidable within the outer piston and secured to a tubular stem 166 integral with the part 158. There are three ports in the body 163 through which liquid is introduced in use to displace the head. A port 167 is provided at the end of the body remote from the head 155. This port 167 admits liquid to move the outer piston 164 relative to the body until it abuts against an end collar 168 of the body. At this position a passage 169 in the outer piston 164 is aligned with a second of the ports 170 in the body wall. If liquid is now introduced into port 170 the inner piston 165 is displaced to complete the stroke of the head 155. The third port 171 is in the end collar 168 and receives liquid to return the head 155 to the position shown in FIGURE 3. Such return is accomplished in two stages, during the first of which liquid is supplied to port 167 and port 171 whilst port 170 is opened to exhaust and during the second of which liquid is supplied to port 171 only.

Rotary movement of the part 156 of the head 155 is effected by means of a vane-type rotary hydraulic acutator 172 attached to the end of the body 163 remote from the head 155. The vane 173 of this actuator 172 is attached to a rotatably supported boss 174 which has a splined connection with a spindle 175 extending through the stem 166. Axial movement of the spindle 175 with the stem 166 is thus permitted, spindle 175 being coupled to the part 156 of the head 155. The casing of the rotary actuator 172 has two ports 179, 180 to which fluid is supplied to turn the spindle 175 in opposite directions respectively.

For detecting the position of the part 156 there are five limit switches. Three of these, namely limit switches LS4, LS5 and LS6 are mounted on a bracket 176 attached to the casing of the rotary actuator 172. A rod 177 attached to spindle 175 projects from the rotary actuator and a disc 178 on the end of this rod actuates switch LS4 when the head 155 is fully withdrawn, switch LS5 when the head 155 is in its intermediate position after movement of the cup-shaped outer piston 164, and switch LS6 when the stem 166 is fully extended. The other two switches LS13 and LS14 are also mounted on the casing of the rotary actuator 172 and are operated by a cam element 181 bolted to the boss 174. This cam element 181 actuates the switches LS13 and LS14 when the actuator is at opposite limits of its travel as defined by a pair of adjustable stops 182, 183 on the casing co-operating with a finger 184 on the cam element 181.

The part 156 of the head 155 has a pair of key slots 185 for picking up the key 114 associated with a tool to be transferred by the tool transfer mechanism 154. Such slots 185 are so situated that, when the head 155 is moved from its fully withdrawn position one of the slots 185 will receive the projecting cylindical portion of the key 114 on the overying tool carrier 51. In the intermediate axial position of the head 155 the various parts will occupy the positions shown in FIGURE 6, with one cylindrical portion of the key 114 received by the slot 118 of the carrier 51 and the other such portion fully received by the slot 185.

For locking the key 114 in position in the slot 185 there is a latch lever 186 pivotally mounted in a passage 187 in the part 156. One end of this lever can enter the slot 185 and is shaped to engage in a notch 117 in the key 114. A spring loaded pusher 188 in a cross bore 189 in the part 156 urges the lever 186 in the direction to engage it, as mentioned above, with the key 114. The opposite end of the lever 186 projects beyond the periphery of the part 176 and is of T-shaped configuration with the "crossbar" of the T extending in a direction parallel to the rotary axis of the head 155.

Figure 6A:
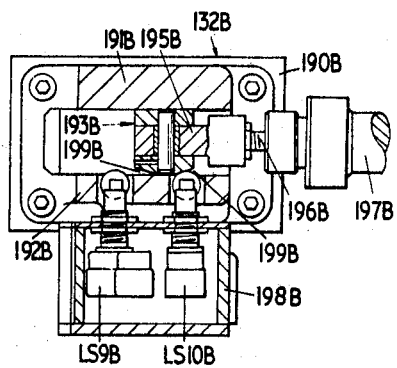
FIGURE 6a is a section on line 6a—6a in FIGURE 6.

It has already been explained above that the latch pieces 119 which hold the keys 114 on the carriers 51 can be released by a mechanism 130. There are, in fact, a pair of such mechanisms which are disposed respectively adjacent the two tool change mechanisms. FIGURES 6 and 6a show the mechanism 130 in some detail. The mechanism 130 includes a base 190 with a pair of upstanding lugs 191, 192. A bell crank 193 is pivotally supported between these lugs with one arm 194 projecting to a position for engagement in the groove 131 of the element 122. The other arm of bell crank 193 is bifurcated and receives a tongue 195 attached to the piston rod 196 of a pivotally mounted double-acting piston and cylinder unit 197.

A switch housing 198 is mounted on the base 190 and contains a pair of limit switches LS9 and LS10 actuable by ramps 199 on the bifurcated end of the bell crank 193. As shown switch LS10 is actuated when the bell crank 193 is in position to permit the spring 125 to urge the element 122 downwardly to the position shown. When the bell crank is swung by the unit 197 to slide element 122 upwardly sufficiently to clear the latch piece 119 from the key 114, the switch LS9 is actuated.

Each tool transfer mechanism 154 has a mechanism 200 for releasing the lever 186 from the key 114. Such mechanism includes an arm 201 pivotally mounted on a bracket 202 on one of the bars 162 of the mechanism 154. One end of the arm 201 has a groove which receives the "crossbar" of the end of the lever 186 when the head 155 is fully withdrawn or in its intermediate, tool transfer position. The other end of the arm 201 is coupled to the piston rod 203 of a double-acting hydraulic piston and cylinder unit 204 pivotally mounted on the bracket 202.

As shown in FIGURE 3 there are also a pair of limit switches LS7 and LS8 mounted on the bracket 202. These are actuable by said other end of the arm 201, the switch LS8 being actuated when the piston rod 203 is withdrawn to free the lever 186 from the key 114 and switch LS7 being actuated when the piston rod 203 is extended to engage the lever 186 with the key 114.

FIGURE 12 shows a device 205 which is employed for accurately locating the magazine disc 50 in any of its thirteen positions. This device 205 comprises a double-acting hydraulic piston and cylinder unit 206 mounted on a bracket on the frame carrying the magazine. The piston rod 207 of this unit 206 carries a wedge-shaped plunger 208 which can enter tapered notches 209 in the periphery of the disc 50. A pair of limit switches LS1 and LS2 on the bracket are actuable by the plunger 208 when the latter is respectively withdrawn and advanced.

FIGURE 18 shows the various hydraulic circuits involved in the control of the hydraulic piston and cylinders included in the tool changing mechanisms. Controlling the magazine drive motor 135 is a three position solenoid actuated valve V31 with solenoids V31A which is energised to drive the magazine forwardly and V31B which is energised to reverse the motor 135 for the manual loading of tools on to the carriers 51. Only solenoid V31A is energised during automatic operation. One port of valve V31 is connected to a medium pressure hydraulic source $P_2$ (at a pressure, for example, of 100 p.s.i.). The other port is connected to a port of a two position solenoid valve 137 which, when de-energised connects valve V31 to a two position solenoid valve V38. When valve V37 is energised it connects valve V31 to drain via a flow restrictor 210 in parallel with a relief valve 211. Valve V38 connects valve V37 directly to drain when de-energised and through a restrictor 212 to drain when energised. The port 149 of the cylinder 148 is connected to the upstream side of the parallel combination of the flow restrictor 210 and the relief valve 211.

For normal forward driving of the magazine valve solenoid V31A is energised and solenoids V37 and V38 remain de-energised. For slow running of the magazine solenoids V31A and V38 are energised. For stopping the magazine (in response to a signal from switch LS3) valve V37 is energised and valve V31 is de-energised so that a pressure pulse is applied to cylinder 148. This causes the peg 146 to be ejected. The pressure pulse ends when the magazine disc 50 is at rest so that there is no flow through the restrictor 210. The liquid in cylinder 148 then leaks away through the restrictor 210 as the spring 153 returns the piston to its initial position.

The device 205 is controlled by a three position solenoid valve V30 with solenoids V30A and V30B. Energisation of solenoid V30A connects a low pressure source $P_1$ (at a pressure, for example, of 50 p.s.i.) to one end of the unit 206 and connects the other end thereof to drain so that the plunger 208 is driven home. Energisation of solenoid V30B reverses these connections to withdraw the plunger 208 leaving the magazine disc 50 free to rotate.

The piston and cylinder units 197A and 197B, which control the locking and unlocking of the keys 114 on the carrier 51 at the respective tool change stations, are controlled respectively by a pair of three position solenoid valves V29 and V19 respectively. In each case there are two solenoids in the case of valve V29, V29A and V29B. Energisation of the former connects source $P_1$ to one end of unit 197A and connects drain to the other end thereof to drive the element 122 in a direction to release the key 114. Energisation of solenoid V29B results in locking of key 114. The solenoids V19A, V19B of valve V19 are likewise arranged.

Also shown in FIGURE 18A is a switch LS20 actuable by a dog 213 on the magazine. The switch (which does not appear in the other figures) is actuated whenever the magazine disc 50 occupies one predetermined angular position. The purpose of the switch LS20 is, as will become clear from the following description, to indicate the completion of a complete revolution of the magazine disc 50 during the tool search phase of a tool change operation. If there are two actuations of switch LS20 whilst the magazine disc 50 is rotating and the tool sought has not been found, it is clear that the tool sought is not in the magazine.

FIGURE 18a also shows a further pair of switches LS15A and LS15B (which are similarly not shown in the other figures). These switches, which are mounted on the magazine supporting frame adjacent the two tool change mechanisms respectively are actuable by the projecting ends of the bolts 109 of the carriers 51 at the respective tool change stations.

Turning now to FIGURE 18b, it will be seen that the units 204A and 204B controlling the interlocking of the keys 114 with the rotatable part 156A or 156B of the tool change head 155A or 155B, are controlled respectively by a pair of three position solenoid valves V28 and V18. Each of these has two solenoids A and B, the former being energised to release the lever 186A or 186B from the key 114 by delivery of liquid from source $P_1$ to the unit 204A or 204B, and the latter being energised to engage the lever 186A or 186B with the key 114.

For controlling the axial motion of the tool changer head 154A there are three valves V23, V24 and V25. The former is a three position solenoid valve with solenoids V23A and V23B and controls the flow of liquid to and from the ports 170A and 171A. In the mid-position of valve V23 both such ports are connected to drain. On energisation of solenoid V23A port 170 is connected to drain and port 171A is connected to the pressure source $P_1$. On energisation of solenoid V23B these connections are reversed.

Valve V24 is a solenoid operated two position valve when de-energised valve V24 connects port 167A to drain. On energisation of valve V24 port 167A is connected to valve V25. This valve is similar to valve V24 and connects the latter to source $P_1$ when de-energised and to source $P_2$ when energised.

The sequence in which these three valves V23, V24 and V25 are energised is as follows: Firstly valve V24 is energised to move the outer piston 164 forward under low pressure. Next solenoid V23A is energised to drive the inner piston 165 forward, it being noted that piston 164 is not moved since the external area exposed to pressure exceeds the internal area exposed to the same pressure. For return movement solenoid V23B and the solenoid of valve V25 are energised simultaneously so that piston 165 is moved rearwardly until it contacts piston 164, the higher pressure applied to the exterior of the latter holding it in its forward position. Finally valve V24 is de-energised whilst solenoid V23B remains energised to return the outer piston 164 to its rearward extreme position.

The control of axial movement of the head 155B is similarly accomplished by valves V13, V14 and V15.

Control of rotary motion of the head 155A is effected by valves V26 and V27. Valve V26 is a two position solenoid valve which is energised to interconnect the ports 179A, 180A of the actuator 172A. This permits free angular movement of the part 156A of the head 155A during axial advance of the head 155A to permit proper alignment of the part 186A under the guiding action of the key 114 on the carrier 51 at the appropriate tool change station. Valve V27 is a three position solenoid valve with solenoids V27A and V27B. The former solenoid is energised to connect port 179A to the drain and port 180A to the source $P_1$. Energisation of solenoid V27B reverses these connections. The actuator 172 is similarly controlled by valves V16 and V17.

In FIGURE 18c there is shown a pair of three position solenoid valves, V20 and V10 respectively, which control clamping of the tools on the tool mount means 39 and 47 respectively. Valve V20 has two solenoids V20A and V20B. Energisation of solenoid V20A connects chamber 90 to pressure source $P_2$ and chamber 89 to drain to clamp a tool on the tool mount means 39. Energisation of solenoid V20B reverses these connections to unclamp the tool. Valve V10 is similarly connected to the tool mount means 47.

The motor 104 for driving a rotary tool on tool mount means 39 is controlled by a valve V32 which is a three position solenoid valve with solenoids V32A and V32B. When neither of these solenoids is energised the valve V32 connects both ports of the motor 104 to drain via a speed selection valve 214 which is a known type of valve arrangement which permits a constant rate of flow to be selected from a plurality of different constant rates. When solenoid V32A is energised valve V32 connects one port of motor 104 to the valve 214 and the other port to a high pressure source of liquid (at say 2000 p.s.i.). The motor is then driven at a selected speed in a "forward" direction. Energisation of solenoid V32B causes the motor to be driven in the reverse direction at the same speed.

For controlling the hydraulic motors 37, 41, 43 and 46 which, as mentioned above move the saddles along the beds and traverse the cross slides across the saddles, there are four servo-controlled valves V22, V21, V12 and V11 respectively. These are controlled by a numerical controller situated in a cabinet 215 standing by the headstock 30 of the lathe. This controller includes a punched tape reader which provides instructions as to selection of tools, speeds of feeds and lengths of strokes.

On the bed 33 there are five pairs of limit switches which appears only in FIGURE 18c. The limit switches LS21A, 22A are arranged at the end of the bed adjacent the magazine 48 and are used to position the saddle 35 for a tool change operation. Switch LS21A is arranged to be actuated by the saddle a short time before LS22A as the saddle travels away from the headstock 30. The switch LS21A is connected in the control circuit of the valve V22 to cause the saddle 35 to be slowed down. Actuation of switch LS22A causes the saddle 35 to be arrested.

The other four pairs of switches mentioned are the pairs LS23A and LS24A, LS25A and LS26A, LS27A and LS28A, and LS29A and LS30A. The switches LS24A, LS26A, LS28A and LS30A are "stop" switches spaced along the bed 33 and define four distinct start positions at which the saddle 35 can be stopped to await the start of a machining cycle after a tool change operation. The remaining switches LS23A, LS25A, LS27A and LS29A are "slow down" switches, mounted on the bed at positions slightly spaced from their partners in a direction away from the headstock and are connected in the feed control circuitry to slow down the saddle 35 immediately before it reaches the position at which it is to be stopped.

The saddle 41 likewise actuates switches LS21–30B on the lower bed 34.

Positioning of the cross slide 38 for a tool change operation is effected under the control of a pair of switches LS31A and LS32A on the saddle 35. The switch LS31A is a "slow down" switch and switch LS32A is a "stop" switch which causes the slide 38 to be arrested with tool mount means 29 in exact axial alignment with the notch 159 in the non-rotary part 158A of the tool transfer head 155A. Switches LS31B and LS32B fulfill the same function in respect to the slide 44.

Figure 13A:
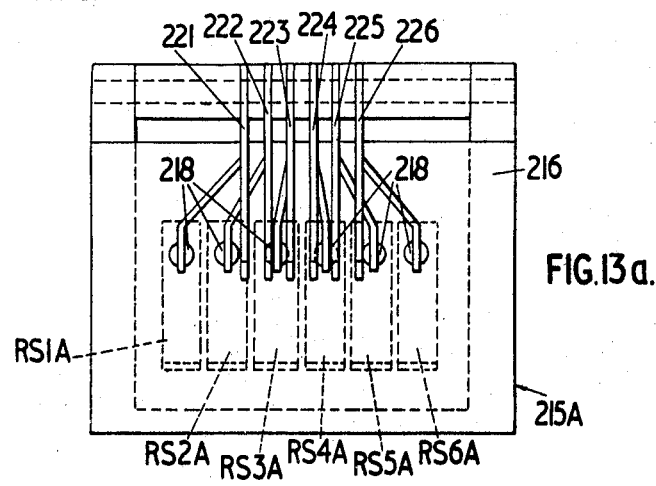
FIGURE 13a is a fragmentary view on the arrow 13a in FIGURE 13.

For the reading of the keys 114 there are a pair of reading heads 215A and 215B situated respectively adjacent the two tool change stations. One such reading head 215A is shown in detail in FIGURES 13 and 13a. The reading head comprises a housing 216 in which there are mounted six identical reading switches RS1A to RS6A arranged in side-by-side relationship. Each such switch is of conventional form, comprising a pair of spaced fixed contacts and a spring contact blade urged by its own resilience into engagement with one of the fixed contacts and deformable by an actuating stem 217 into engagement with the other fixed contact. The six actuating stems 217 are engageable respectively by six plungers 218 slidably mounted in bores in one wall of the housing 216. Each plunger 218 is spring loaded to urge it out of engagement with the associated stem 217.

Mounted on a spindle 219 between a pair of lugs 220 on the housing 216 are six spaced cranked levers 221, 222, 223, 224, 225, 226. One arm of each such lever is straight and these arms extend in a straight parallel relationship projecting from the lugs 220. The edge of each of these arms is shaped to provide a ramp portion 221 and a flat portion 223. The other arm of each of the levers 221 to 226 is cranked, the degree of cranking varying to suit the relative spacing between the groove positions of the key 114 (which spacing determines the spacing of the projecting arms) and the spacing of the plungers 218, which are respectively engaged by the cranked arms of the levers 221 to 226.

The reading head 215A is mounted on a bracket on the magazine frame at such a position that the arc between trailing edge of the flat portion 223 of the straight arm of each lever and the position of a key 114 at the upper tool change station subtends an angle of 21° at the axis of the disc 50. The length of the flat portion 223 is such that it subtends an angle of 2½° at the axis of the disc 50. The flat portion 223 is tangential to the path of a key 114, when the lever 221 is depressed sufficiently to actuate the corresponding switch RS1A. Thus, in use, a lever is depressed by a passing key 114, if there is no groove at the corresponding position on the key 114, for the time taken for the disc 50 to turn through 2½° and is then released.

FIGURE 20 shows the switches RS1 to RS6 connected in the electronic logic circuit they control. In this figure the common terminal RS1$t$ of the switch RS1 is connected to a line 224 held at +20 v. Each of the other terminals RS1$o$ and RS1$c$ (being respectively normally open and normally closed) are connected via resistors 225, 226 to a line 227 held at 0V.

There are six bistable circuits $B_1$, $B_2$, $B_3$, $B_4$, $B_5$ and $B_6$, which are controlled respectively by the switches RS1, RS2, RS3, RS4, RS5, RS6. The circuits $B_1$ to $B_6$ are identical each having first and second input terminals $a$ and $b$, first and second output terminals $c$ and $d$ and a reset terminal $e$. Each circuit is of well known form such that in one state, to which it can be driven by a pulse at terminal $b$, there is a continuous output from terminal $d$, and in the other state, to which it can be driven by an input at terminal $a$, there is a continuous output from terminal $c$. The circuit can also be driven into said one state by a pulse at terminal $e$. The reference letters $a$, $b$, $c$, $d$ and $e$, have been applied in the drawing only to circuit $B_1$ but the same letters also apply to the corresponding terminals of the other bistable circuits.

The $a$ terminals of the six bistable circuits are connected respectively to he "normally open" terminals RS1$o$ to RS6o. The b terminals are all connected to a terminal 228. The d terminals are connected respectively to input terminals of six NOR gates $N_1$, $N_2$, $N_3$, $N_4$, $N_5$, and $N_6$ which have further input terminals connected respectively to the "normally closed" terminals RS1c to RS6c.

The outputs of the NOR gates $N_1$, $N_2$ and $N_3$ are collected by an OR gate $O_1$ and those of gates $N_4$, $N_5$ and $N_6$ by an OR gate $O_2$. The output terminals of the OR gates $O_1$ and $O_2$ are connected to input terminals of a NOR gate $N_7$. The output terminal of gate $N_7$ is connected to a delay circuit 229 which in turn drives a monostable circuit $M_1$ which has its output terminal connected to the e terminals of all six bistable circuits $B_1$ to $B_6$.

The portion of the circuit so far described operates when the magazine disc 50 is rotating. Provided that there is no input applied at terminal 228, the actuation of any one of switches RS1 and RS6 by a key 114 will result in an input being applied to the a terminal of the associated bistable circuit, thereby setting the latter to produce a continuous output from its c terminal and removing the output from its d terminal. In the case, for example of the key 114 shown in FIGURE 6, bistable circuits $B_2$, $B_4$, and $B_6$ would be set but circuits $B_1$, $B_3$ and $B_5$ would remain unaltered. As a result NOR gates $N_2$, $N_4$ and $N_6$ would receive no inputs and would therefore produce outputs. NOR gate $N_7$ would therefore produce no output.

After the 2½° movement of the disc 50 is completed the switches RS2, RS4 and RS6 which were actuated by the key 114 will resume their normal conditions. This has no immediate effect on the bistable circuits, but closing of the contacts to terminals RS2c, RS4c and RS6c provides inputs for the NOR gates $N_2$, $N_4$ and $N_6$ respectively, so that the outputs from these cease. There will thus be no outputs from OR gates $O_1$ and $O_2$ so that NOR gate $N_7$ will produce an output. There is then a delay, brought about by delay circuit 229, before monostable circuit $M_1$ produces a pulse which resets all the bistable circuits preparatory to the next key 114 reaching the reading head.

It will be seen that there is a short period during which the NOR gate $N_7$ is producing an output and the bistable circuits remain in the states to which they have been set by the key 114.

The circuit shown includes six input terminals 230, 231, 232, 233, 234 and 235 from the tape reader. During a tool selection operation inputs are impressed upon the terminals according to the coding of the key 114 of the tool required. Thus in the case of a requirement for the tool accompanied by the key 114 of FIGURE 6 inputs would be impressed on terminals 231, 233 and 235 and continuously maintained until the tool in question was located.

Terminals 230 to 235 are connected respectively via inverters $I_1$ to $I_6$ to input terminals of six NOR gates $N_8$ to $N_{13}$. These NOR gates also have input terminals connected to the c terminals of circuits $B_1$ to $B_6$ respectively. The terminals 230 to 235 are also directly connected respectively to input terminals of six NOR gates $N_{14}$ to $N_{19}$, which have further input terminals connected respectively to the d terminals of circuits $B_1$ to $B_6$. The output terminals of gates $N_8$, $N_9$, $N_{14}$ and $N_{15}$ are connected to an OR gate $O_3$, those of gates $N_{10}$, $N_{11}$, $N_{16}$ and $N_{17}$ to an OR gate $O_4$ and those of gates $N_{12}$, $N_{13}$, $N_{18}$, and $N_{19}$ to an OR gate $O_5$. The outputs of these OR gates are connected to a NOR gate $N_{20}$.

Thus the arrangement is such that if any one of the NOR gates $N_8$ to $N_{19}$ receives no input signals whatever the NOR gate $N_{20}$ will produce no signal. If, on the other hand each NOR gate $N_8$ to $N_{19}$ receives a signal at one of its input terminals there will be an output from gate $N_{20}$.

In the specific case mentioned above where the tool code is 010101 and corresponding signals are impressed on the terminals 230 to 235 by the tape reader each gate $N_8$ to $N_{19}$ will receive exactly one input signal—gate $N_8$ receives its signal from inverter $I_1$, gate $N_{14}$ receives its signal from terminal d of circuit $B_1$, gate $N_9$ receives its signal from terminal c of circuit $B_2$, gate $N_{15}$ receives its signal from terminal 231 and so on. Had the key 114 being read actually had the code 010111 (i.e. Tool No. 17) gate $N_{18}$ would receive signals from neither terminal 234 or from terminal d of circuit $B_5$ and would therefore have produced an output which would have prevented gate $N_{20}$ from producing an output.

The output terminal of gate $N_{20}$ is connected to one input terminal of and AND gate & which also has an input terminal connected to the output terminal of gate $N_7$ and a further input terminal connected to a terminal 236. Terminals 236 and 228 are both connected to a logic circuit not shown which passes an output to terminal 236 whenever a tool selection operation is required, the magazine disc 50 is rotating and the coding called for by the tape reader is other than 000000. Under any other conditions no signal is applied to terminal 236 but a continuous signal is applied to terminal 228 to hold bistable circuits $B_1$ to $B_6$ in their reset conditions.

The AND gate & is followed by a monostable circuit $M_2$.

Thus, under the conditions specified above the keys 114 set the appropriate bistable circuits $B_1$ to $B_6$ as they pass the reading head. These circuits remain set after the reading switches RS1 to 6 are de-actuated and on the production of an output by gate $N_7$ the AND gate & interrogates gate $N_{20}$. If the coding called for does not match the coding read there is no output. After re-setting of the circuits $B_1$ to $B_6$ the next key is read and the cycle is repeated until the correct key is found. Upon interrogation of NOR gate $N_{20}$ a pulse is then produced which initiates stopping of the magazine disc 50.

Figure 19C:
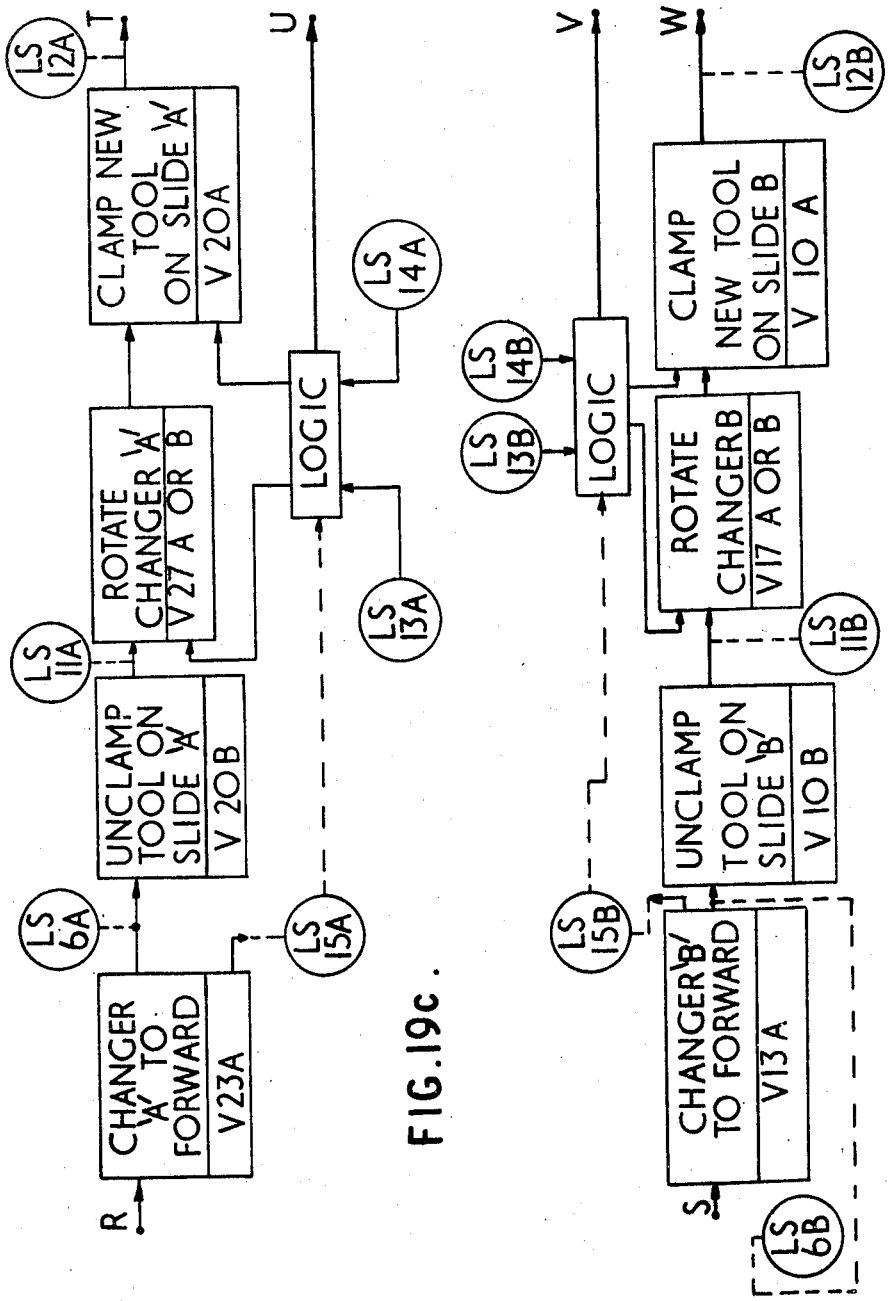
FIGURE 19 is a diagram illustrating the basic logic involved in a tool change operation sequence, being in four parts 19a, 19b, 19c and 19d which can be assembled in that order from left to right to make up a single diagram.

The complete sequence of operations involved in a tool change is shown diagrammatically in FIGURE 19. The tape command given comprises a tool number command—already mentioned above in connection with the tool selection circuits—a station selection command and a park position command.

On receipt of the command switches LS1, LS4A, LS4B, LS9A and LS9B are examined by a logic circuit and if all are actuated a signal is produced to energise solenoid VR1A. The magazine disc 50 is thus set in motion at full speed. Provided that the tool number command is other than 000000 a signal is how applied to terminal 236 of each selection circuit and the signal previously at terminal 228 is removed. The selection cycle then proceeds. If the tool is not found in the magazine this will be indicated after two actuations of switch LS20 and the magazine will be stopped and a warning lamp lit. If the tool is required for tool mount means 39 (which will at the present time be engaged in a machining operation with saddle 41 parked ready for the next machining operation) the signal received by the magazine control logic circuits will prevent any pulse received from the selector circuit B from initiating stopping of the magazine disc 50. On receipt of a pulse from selector circuit A, however, valve V38 will be energised to slow the magazine down. On actuation of switch LS3 the magazine will be stopped with the appropriate tool carrier 51 presented to the tool transfer mechanism 154A. This stage in the operation is, in fact, shown in FIGURE 3 although the tool transfer mechanism 154B is, of course, depicted therein. Solenoid V31A is then de-energised and solenoid V30B is energised to drive the plunger 208 into the appropriate notch 209 so to locate the magazine in the required position.

Completion of this action is signalled by switch LS2 actuation of which initiates forward motion of the transfer head 155A to the intermediate position by energisation of valve V24. Valve V26 is also energised to permit the pilot action of the key 114 entering the slot 185A. Actuation of switch LS5A causes energisation of solenoid V28A to operate unit 204A for engaging lever 186A with the key 114. Actuation of switch LS7A on completion of this action causes energisation of solenoid V29A to actuate unit 197 for releasing latch piece 119 from the key 114. On completion of this operation, which is signalled by actuation of switch LS10A, there is nothing further to be done by the tool transfer mechanism 154A until the tool mount means 39 is in position.

At the end of the current machining operation the tool mount means 39 is moved into position for tool exchange. This operation is accomplished in two stages. Firstly the slide 39 is moved to one end of its travel under the control of valve V21. The switch LS13A senses the approach of the slide 39 and causes the rate of traverse of the latter to be reduced. On actuation of switch LS32A the slide is arrested. The saddle 35 is then driven along the bed 33 away from the headstock 32 until it actuates switch LS21A. The saddle 35 then completes its stroke at reduced speed until it is arrested on actuation of switch LS22A. The tool mount means 39 is then precisely in position for the tool transfer operation.

The tool transfer head 155A is now moved to its forward position, by energisation of the solenoid V23A. The key 114 is carried forward with the head 155. On completion of the stroke of the head 155, detected by switch LS6A, the solenoid V20B is energised to release the used tool from the tool mount means. Completion of this action is signalled by actuation of switch LS11A. De-actuation of the switch LS15A on forward motion of head 155 releasing the bolt 109 indicates that the selected tool is free for transfer to the tool mount means 39. The next action is the operation of valve V27 to turn the part 156A of the head 155A through 180°. The mode of operation of valve V27 will depend on the present position of the part 156 as sensed by switches LS13A and LS14A. If LS13A is actuated then solenoid V27A will be energised on actuation of switch LS11A. If on the other hand switch LS11A is in actuated condition then solenoid V27B will be energised. In either case the part 156A is driven through 180° and the completion of this movement is sensed by the switch LS13A or LS14A not previously actuated.

Turning of the part 156 in this way causes the old tool and the selected tool to be driven along the substantially continuous track formed by the dovetail keys 107, 161A and 80. Transfer of the tools is effected completely without axial displacement thereof by the tool transfer head 155A.

The selected tool is now clamped on the tool mount means 39 by energisation of solenoid V30A. This causes withdrawal of the spigot 85 into the casing of tool mount means 39, drawing the toothed coupling rings 65, 81 into firm engagement as well as interengaging the dog member 102 with the dog 72. The sleeve 95 slides forward to urge the balls 91 into the notches 93 so as to lock the draft member mechanically independently of the hydraulic system.

On actuation of switch LS12A two operations commence. The first of these is the driving of the saddle 35 to its selected parking position according to the tape instructions. Thus, the saddle will be driven towards the headstock at full speed until it actuates switches LS24A, LS26A, LS28A or LS30A according to the tape instruction. The partner of the switch just actuated is met, whereupon the saddle 35 will be arrested. The selected tool is then ready for use for when tape commends relating to positioning, speed of advance and speed of rotation (in the case of a rotary tool) are received.

Meanwhile the second operation is proceeding. This commences with the return of the head 155A to its intermediate position. This involves energisation of solenoid V23B and of valves V24 and V25. The valve V26 is also energised to permit slight turning of the part 156A of the head 155A resulting from the pilot action of the key 114 in the slot 118. Switch LS5A signal completion of this action whereupon solenoid V29B is energised to engage the latch piece 119 with the key 114. Actuation of switch LS9A causes energisation of solenoid V28B to engage level 186A with the key 114. Actuation of limit switch LS8A then causes energisation of solenoids V23B and de-energisation of valves V24 and V25 so that the head 155 is moved back to its rear parking position clear of the magazine disc 50. When the plunger 208 is withdrawn the disc 50 can again rotate for the presentation of the next tool to the tool transfer device 154B.

It will be appreciated that where, as described above, the tool identification devices are completely separate from the tools at all times, it is an extremely simple matter to allot a code to or change the code of a tool. It is merely necessary to select an appropriate key 114 and load it into the magazine with the tool. Thereafter the key will be picked up by the head 155 on each occasion when the tool is removed and replaced with the tool after use.

It will be noted, however, that the key 114 does not accompany the tool to its working station as occurs with coding rings mounted directly on the tool or tool holder. There is thus little danger that the keys 114 will become contaminated with chips, swarf etc. Thus the risk of a key 114 improperly actuating the reader is substantially avoided.

Where a large number of tools are in use with a particular machine the binary coding obtained by the system of grooves on the key, may require a considerable number of digits. In the prior art, where the tools or tool holders are themselves coded by rings or other projections the size of the tools or tool holders must be increased significantly. When separate keys are used, as described above, extremely long code designations can be employed without any effect on the tools or tool holders.

Various other types of tool identifying devices could be employed with an appropriate reading head. For instance the coding of such a device could be obtained by coloured markings readable, for example, by photo-electric means. Alternatively magnetic, electro-static, electro-dynamic, or inductive means could be employed. As yet a further alternative, fluid logic devices are available which could be used for this purpose.

It will be appreciated that, in the example described, the tool identifying key can be read when in position on the transfer turntable to verify that the correct tool is on the tool mount means. To this end an additional pair of readings heads would be mounted on pivoted carriers swingable to bring the switch operating levers thereof into contact with the key 114. This operation would occur at the completion of the tool change sequence, verification of the coding being required to permit the tool mount means to receive further instructions. The addition reading head may also be employed to check the key on head 155 if the switch LS20 reports that the tool called up is not in the magazine.

In a modification the means for removing and replacing the keys may be separate from the tool transfer means thereby, if desired, permitting the keys to be located in the magazine at positions removed from their associated tools.

Having thus described my invention what I claim as new and desire to secure by Letters Patent is:

1. A machine tool comprising, in combination, a frame, at least one tool mount means for receiving a tool for operating on a workpiece, a tool storage magazine with a plurality of tool carriers for carrying a plurality of different tools individually receivable by said tool mount means, a plurality of locating means for tool identification devices corresponding to tools carried by said tool carriers, power operable means for driving said tool carriers about a closed path, said tool identification device locating means being driven in synchronism with said tool carriers, tool identification means co-acting with said tool identification devices, to sense the position of a desired tool in the magazine, power operable tool transfer means for transferring tools between the magazine and the tool mount means, control means actuable by said tool identification means to stop said power operable means with a tool carrier carrying a desired tool presented to the tool transfer means, and means for removing from and replacing in its locating means a tool identification device on removal and replacement of a corresponding tool.

2. A machine tool as claimed in claim 1 in which said means for removing and replacing a tool identification device is part of said tool transfer means.

3. A machine tool as claimed in claim 2 in which said tool transfer means comprises tool engaging means for applying tool transferring movement to a tool and locating means for receiving and retaining a corresponding tool identification device whilst the corresponding tool is in operation.

4. A machine tool as claimed in claim 3 in which each tool identification device comprises a key having a pair of spaced parallel cylindrical portions interconnected by a web portion, and in which each tool carrier has a key hole slot to receive one cylindrical portion and the tool transfer means includes a movable part having a key hole slot to receive the other cylindrical portion.

5. A machine tool as claimed in claim 4 further comprising a plurality of spring-loaded latch pieces on said tool carriers respectively engageable with keys in said keyhole slots respectively, and release means adjacent said tool transfer means actuable to release the latch piece of a tool carrier presented to the tool transfer means.

6. A machine tool as claimed in claim 4 further comprising a pivoted, spring-loaded latch lever on said movable part of the tool transfer means, said lever being urged by its spring-loading into engagement with a key in the keyhole slot in said movable part, and release means on a fixed part of the tool transfer means to engage said lever and release same from engagement with the key.

7. A machine tool as claimed in claim 1 in which said magazine incorporates a disc on the periphery of which said tool carriers are mounted at equi-angularly spaced positions, in which said power operable means includes a rotatable spindle geared to said disc to make a complete revolution whilst the disc turns through the angle corresponding to the angular spacing of said tool carriers, and in which said control means includes a cam on said spindle and a device actuable by said cam to stop the power operable means on actuation of said device after receipt of a signal from the tool identification means.

8. A machine tool as claimed in claim 7 including an hydraulic motor for driving said disc, a first valve actuable to cause driving of said motor at full speed, a second valve actuable to cause driving of said motor at low speed and a third valve actuable to stop said motor, said control means comprising means to actuate said second valve on receipt of a signal from said tool identification means whilst the first valve is actuated, and means to actuate said third valve on actuation of said device by said cam.

9. A machine tool as claimed in claim 1 in which said tool identification devices are in the form of keys each formed with a different arrangement of grooves and said tool identification means comprises a plurality of switches actuable in combinations determined by the arrangements of grooves in the keys, a plurality of bistable flip-flop circuits connected to said switches for actuation thereby, a plurality of terminals on which electrical signals defining the coding of a desired tool are impressed, and a logic circuit connected to said bistable flip-flop circuits and to said terminals to compare the outputs from said bistable flip-flop circuits with the signals impressed on said terminals so as to produce a signal when the key associated with the desired tool actuates said switches.

10. A machine tool comprising a base structure, for mounting a workpiece for machining, at least two tool mount means independently movable on the base structure for carryiny tools to operate on a workpiece in the workpiece mounting means, and at least two tool transfer means for transferring tools from tool storage means to the tool mount means respectively, the arrangement being such that a tool change operation can be effected in respect of one of the tool mount means, whilst a machining operation is in progress involving the other tool mount means.

11. A machine tool as claimed in claim 10 further comprising a tool storage magazine rotatable about an axis equi-distant from the tool transfer means so that any tool can be transferred from the magazine to either of the tool mount means by the appropriate one of the tool transfer means.

12. A machine tool as claimed in claim 11 further comprising a plurality of tool identification devices removably mounted on the magazine in association with the respective tools therein, tool identification means coacting with the tool identification devices during rotation of the magazine to detect the location of the tools in the magazine and control means which receives commands as to which of the tools is to be placed on which of the tool mount means, said control means being actuable by the tool identification means to arrest the magazine with the desired tool presented to the tool transfer means associated with the desired tool mount means.

13. A machine tool as claimed in claim 10 further comprising numerical control equipment connected to control the motion of said tool mount means, a plurality of switch devices actuable by each tool mount means when the latter occupies a plurality of parking positions respectively, and control means which receives commands as to the parking position at which a tool mount means is to be parked following a tool change operation, said control means causing the tool mount means to be arrested at the desired parking position on actuation of the corresponding switch device.

14. A machine tool comprising at least one tool mounting means adapted to receive a tool for operating on a workpiece in the machine tool, an indexible tool storage magazine including a plurality of tool carrying elements for carrying tools for mounting on the tool mounting means, and a power operated tool transfer device for interchanging a tool on the tool mount means with a selected tool from the tool storage magazine, characterised in that the tool transfer device transfers tools between the tool storage magazine and the tool mounting means without any axial motion being applied to said tools by said tool transfer device.

15. A machine tool comprising at least one tool mounting means, adapted to receive a tool for operating on a workpiece in the machine tool, an indexible tool storage magazine including a plurality of tool carrying elements for carrying tools for mounting on the tool mounting means, and a power operated tool transfer device for interchanging a tool on the tool mounting means with a selected tool on the tool storage magazine, characterized in that said tool transfer device includes a non-rotatable part, which is aligned with the tool mounting means and any one of the tool carrying elements to form a substantially continuous circular track for guiding tools during transfer, and an angularly movable part having tool engaging portions engageable with tools to displace them along the track on angular movement of the angularly movable part having tool engaging portions engageable with tools to displace them along the track on angular movement of the angularly movable part relative to the non-rotatable part.

16. A machine tool as claimed in claim 15 in which said circular track is constituted by curved ribs of dovetail section on the tool carrying elements, the non-rotatable part of the tool transfer means and the tool mount means.

17. A machine tool comprising a base structure, workpiece mounting means on said structure, at least one tool mount means on said structure, power means for imparting motion to tool mount means relative to the workpiece mounting means for the performing of a machining operation on a workpiece on said workpiece mounting means by a tool mount means, a rotary tool storage magazine supported on said structure and incorporating a plurality of carriers for a plurality of different tools for placement on said tool mount means, said tool mount means and each of said tool carriers having arcuate dovetail track sections of the same radius and being positionable to render said track sections concentric, and a tool transfer means which comprises a non-rotatable part with a pair of arcuate dovetail track sections arranged to fit between the track sections of the tool mount means and any one of the tool carriers so as to define a substantially closed circular track, and a rotatable part having tool engaging portions for engaging a tool on a tool carrier and the tool mount means respectively and pwer operable means for turning said rotatable part to interchange the positions of said tools by movement thereof along the track.

18. A machine tool as claimed in claim 17 further comprising a tool transfer head comprising said non-rotatable part and said rotatable part, and means for displacing said head axially of said rotatable part between withdrawn position in which the head is clear of the magazine to permit rotation thereof, and a tool transfer position in which said track sections make up said track as aforesaid.

19. A machine tool as claimed in claim 18 further comprising a plurality of tool identification keys removably mounted on said tool carriers respectively, means on the rotatable part of the tool transfer head for receiving said key and means for effecting transfer of the keys between the head and the tool carrier when the head is at an axial position intermediate said withdrawn position and said tool transfer position.

20. A machine tool as claimed in claim 19 wherein said means for axially displacing the head comprises a cylinder, a cup-shaped piston slidable within said cylinder, a further piston slidable within said cup-shaped piston and movable thereby, a stem connecting said further piston to said head and valve means actuable to admit pressurised liquid to the cylinder and to the interior of the cup-shaped piston whereby the head can be moved between its withdrawn position and its intermediate position by movement of said cup-shaped piston relative to the cylinder and between its intermediate position and its tool transfer position by movement of said further piston relative to the cup-shaped piston.

21. A machine tool as claimed in claim 20 wherein the power operable means for timing the rotatable part of the head comprises a fluid operated rotary actuator mounted on said cylinder and having an angularly movable member, and a spindle attached at one end to the rotatable part of the head, extending along a passage in the stem and having a slidable splined connection at the other end with the angularly movable member of the rotary actuator.

22. A machine tool comprising a base structure, a tool storage magazine for carrying a plurality of different tools for carrying out a plurality of different machining operations, a tool mount means for selectively receiving tools from the magazine and supporting such tools during machining operations and a tool transfer means for transferring tools between the magazine and the tool mount means, said tool mount means comprising a casing, a toothed coupling ring mounted on said casing and adapted to coact with a similar ring on a tool holder to locate the tool holder accurately in position on the casing in a predetermined orientation, a draft member slidably mounted in the casing and movable by power means to a projecting position extending beyond said coupling and a withdrawn position, said member having means engageable with a tool holder to draw its coupling ring into engagement with the coupling ring on the casing, and mechanical locking means actuable to retain said member in its withdrawn position independently of said power means and releasable on actuation of said power means to move said member to its projecting position.

23. A machine tool as claimed in claim 22 in which said power means comprises a piston secured to said draft member slidable within a cylinder formed by the casing, and valve means for supplying pressurised fluid to said cylinder for moving the piston in opposite directions as required.

24. A machine tool as claimed in claim 23 in which said mechanical locking means comprises an integral sleeve on said piston, a plurality of balls located in cross bores in said sleeve, the diameters of said balls being in excess of the thickness of the sleeve, a spring-loaded collar within said sleeve formed with a cam groove of depth at least as great as the excess of the diameter of the balls over the thickness of the sleeve, said cam groove defining an inclined ramp so that the spring loading of the collar causes an outward force to be applied to said balls, and a wall portion within which said sleeve fits, said wall portion having internal recesses positioned to receive the balls respectively when the draft member occupies its withdrawn position, and said collar acting to prevent inward movement of said balls.

25. A machine tool as claimed in claim 24 in which there is a tubular insert within said collar and attached to said sleeve to form a chamber in communication with a space within the cylinder to which pressurised fluid is supplied to drive the draft member to its projecting position, the collar slidingly engaging both the sleeve and the insert so as to be movable by pressurised fluid against its spring loading.

26. A machine tool as claimed in claim 25 in which the draft member has a dovetail key extending across its free end for engagement in a complementary dovetail groove in a co-acting tool.

27. A machine tool as claimed in claim 26 in which said dovetail key is of arcuate form.

28. A machine tool as claimed in claim 24 further comprising a power drive shaft engaged at one end in a bearing in the casing and at the other end in a bearing within the draft member, said shaft being adapted at said other end for driving engagement with a rotary part of a tool mounted on the tool mount means.

29. A machine tool comprising a base structure, work mounting means rotatably mounted on said base structure, a tool mount casing on said base structure mounted for movement in a direction axially of said work mounting means towards and away from said work mounting means and in a transverse direction, a toothed coupling ring on said casing extending in a plane perpendicular to the axis of said work holding means, said ring having teeth projecting axially towards the work holding means and shaped to coact with a similar coupling ring on a tool accurately to a position, the latter on the casing, draft means in the casing for engaging a tool to draw the latter towards the casing so that coupling rings interengage, a magazine for containing a plurality of tools provided with toothed coupling rings and adapted for engagement by said draft means, and a tool transfer means for transferring a selected tool from the magazine into engagement with said draft means.

30. A machine tool as claimed in claim 29 in which said toothed coupling ring has radially extending teeth defined by flat top surfaces and sloping flanks bounding inter-tooth grooves which increase in depth in a radially outward direction.

31. A machine tool comprising a base; a workpiece mounting means supported on said base structure; a tool mount means mounted on said base structure for movement relative to the workpiece mounting means, said tool mount means comprising a casing, a toothed coupling ring on the casing for interengagement with a similar ring on a tool for accurately locating the tool of the casing, a draft member slidable in the casing and arranged to be extendable through the ring and engageable with a tool for drawing a toothed coupling ring therein firmly into engagement with the tooth coupling ring on the casing, and a rotatable drive shaft extending into a passage in said draft member and having at its end a drive coupling part adapted to engage a coacting drive coupling part on a rotatable part of a tool drawn by said draft means onto the casing; a tool storage magazine for a plurality of different tools receivable by said tool mount means; and tool transfer means for transferring a tool selected from the magazine into engagement with the draft means.

32. A machine tool as claimed in claim 31 further comprising at least one tool incorporating a body, having thereon a toothed coupling ring in engagement with the toothed coupling ring on the casing of the tool mount means, a rotatable tool bearing part journalled in the body, a drive coupling part mounted within said tool bearing part so as to be axially movable but non-rotatable relative thereto, and spring means within said tool bearing part urging the drive coupling part into driving interengagement with the drive coupling part of the tool mount means.

References Cited
UNITED STATES PATENTS

| | | | |
|---|---|---|---|
| 3,185,492 | 5/1965 | Dziedzic | 29—568 |
| 3,186,266 | 6/1965 | Coate | 29—568 |
| 3,191,260 | 6/1965 | Jorgensen | 29—568 |
| 3,316,786 | 5/1967 | Coate | 29—568 |

RICHARD H. EANES, Jr., Primary Examiner